United States Patent [19]

Kuramochi et al.

[11] Patent Number: 5,008,552
[45] Date of Patent: Apr. 16, 1991

[54] DATA RECORDING AND REPRODUCING APPARATUS FOR AN OPTICAL CARD

[75] Inventors: Wataru Kuramochi, Kawagoe; Yoshiaki Tsuruoka, Funabashi; Norikazu Saitou, Fuchu; Akira Shibuya, Ageo; Shuichi Yamashita, Shinjuku, all of Japan

[73] Assignee: Dai Nippon Insatsu Kabushiki Kaisha, Japan

[21] Appl. No.: 274,994

[22] PCT Filed: Feb. 12, 1988

[86] PCT No.: PCT/JP88/00142
  § 371 Date: Oct. 7, 1988
  § 102(e) Date: Oct. 7, 1988

[87] PCT Pub. No.: WO88/06335
  PCT Pub. Date: Aug. 25, 1988

[30] Foreign Application Priority Data

| Feb. 12, 1987 | [JP] | Japan | 62-18978 |
| Feb. 12, 1987 | [JP] | Japan | 62-30583 |
| Feb. 12, 1987 | [JP] | Japan | 62-30586 |
| Mar. 31, 1987 | [JP] | Japan | 62-78040 |
| Jun. 11, 1987 | [JP] | Japan | 62-146086 |
| Jun. 11, 1987 | [JP] | Japan | 62-146087 |

[51] Int. Cl.$^5$ .................. G06K 13/06; G06K 13/24
[52] U.S. Cl. .................... 235/483; 235/449; 235/454; 235/484; 235/485
[58] Field of Search ............ 235/483, 484, 454, 449, 235/485

[56] References Cited

U.S. PATENT DOCUMENTS

| 3,845,279 | 10/1974 | Rosdorff | 235/454 X |
| 4,254,329 | 3/1981 | Gokey | 235/454 X |
| 4,782,221 | 11/1988 | Borass et al. | 235/454 X |

FOREIGN PATENT DOCUMENTS

| 53013 | 5/1974 | Japan . |
| 23809 | 2/1979 | Japan . |
| 23591 | 2/1980 | Japan . |
| 160839 | 7/1986 | Japan . |
| 165855 | 7/1986 | Japan . |
| 165856 | 7/1986 | Japan . |
| 202375 | 9/1986 | Japan . |

Primary Examiner—Harold Pitts
Attorney, Agent, or Firm—Parkhurst, Wendel & Rossi

[57] ABSTRACT

Data can be recorded onto an optical card (102; 200; 601; 800) on which a plurality of tracks are parallelly arranged and can be reproduced therefrom. The optical card is supported by card supporting means (101; 501). This card supporting means is reciprocated in a first direction by card drive means (109; 511). An optical head (103; 503; 603) is provided above the optical card to selectively provide access to tracks by a light beam. This optical head is reciprocated in a second direction perpendicular to the first direction by head drive means (108; 507). The reciprocating motion of the card supporting means is accelerated and decelerated when the optical head scans on guide sections (G) provided on both the sides of the optical card. Error correcting codes are added to data recorded onto the optical card. Thus, error correction is made by an error correction circuit (136). Motors of respective drive means are enclosed with vibration proof metal (321, 323) and vibration proof rubber (322). The card supporting means (101) comprises pressing means (423) for pressing the upper surface of the optical card and positioning means (425) which can be in contact with the side surface of the optical card and away therefrom, thus to carry out positioning of the optical card. The card supporting means (501) is provided with contact surface (501a). By roller means (506) having rotation shaft (505) slightly inclined with respect to perpendicular (505') set up on the plane including the contact surface, optical card inserted from the outside is introduced toward the contact surface. The optical head (103) is ordinarily controlled by feedback control.

6 Claims, 22 Drawing Sheets

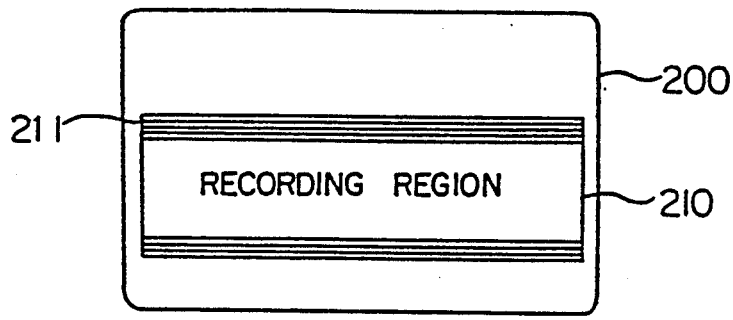
FIG. 6
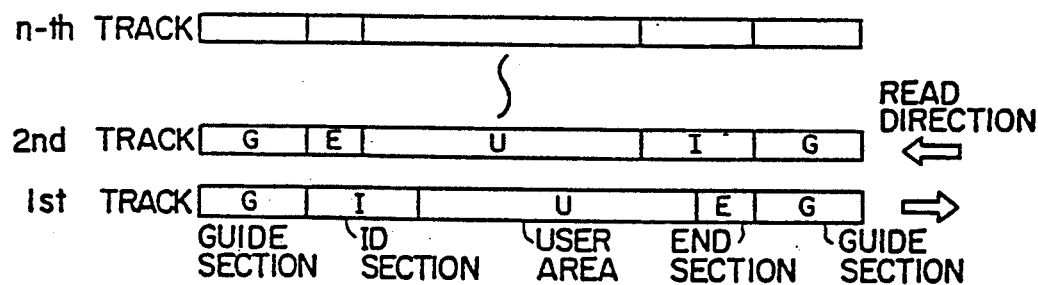
FIG. 7
FIG. 8a
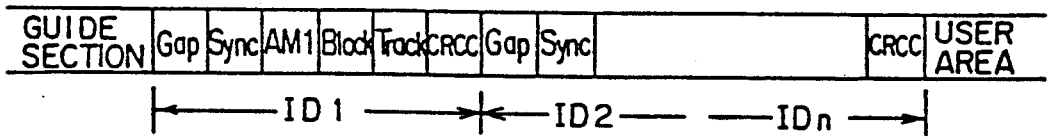
FIG. 8b
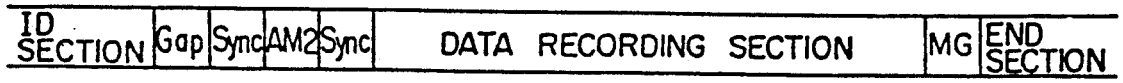
FIG. 8c
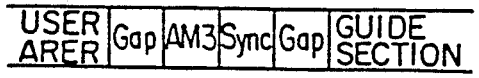

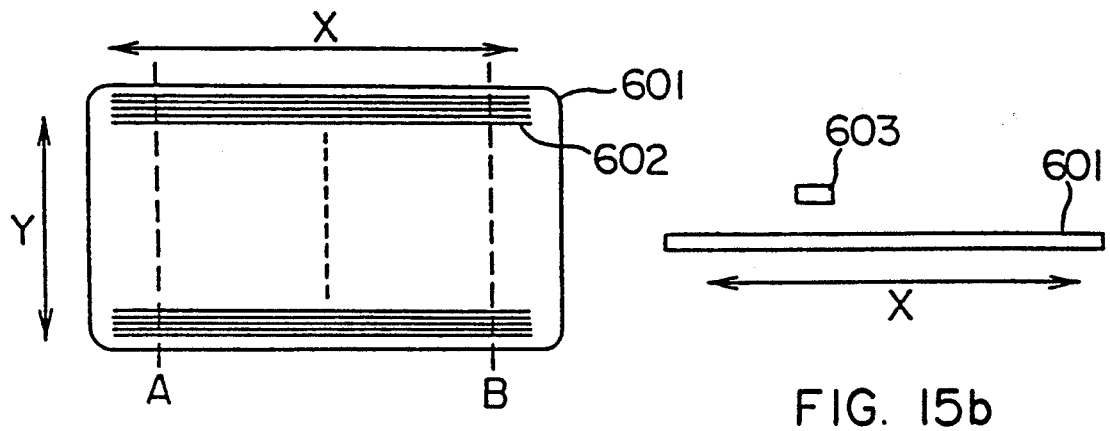
FIG. 15a
FIG. 15b
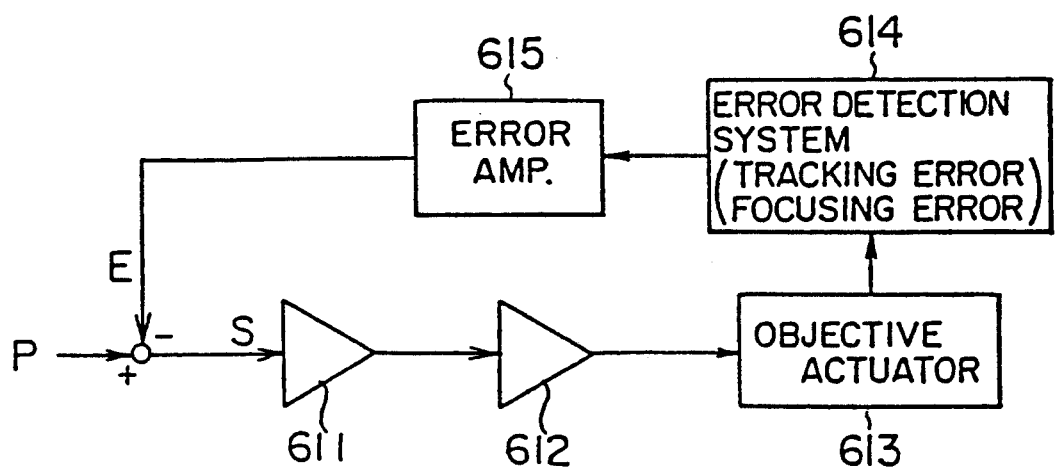
FIG. 16

INPUT SIGNAL I

BINARIZED SIGNAL O

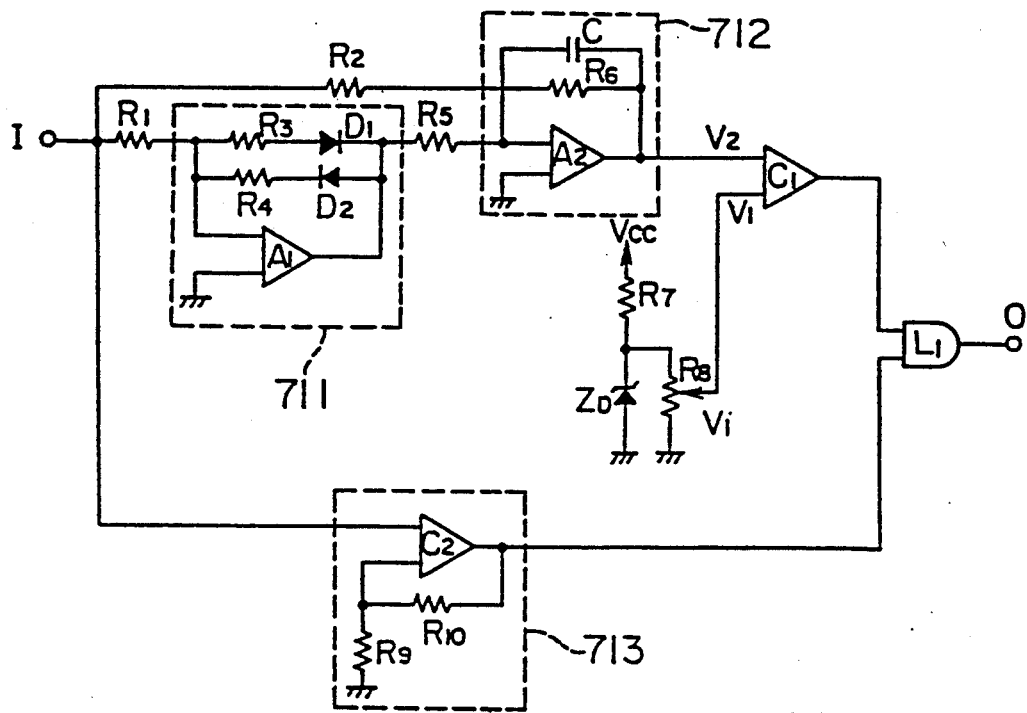
FIG. 24
FIG. 25a
INPUT SIGNAL I
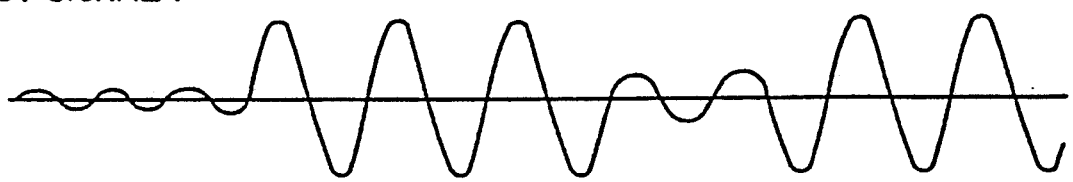
FIG. 25b
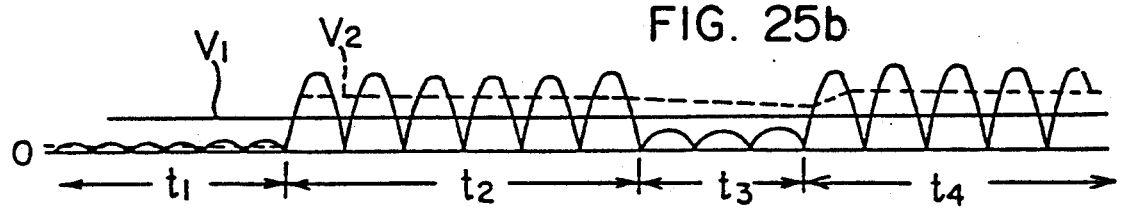
FIG. 25c
BINARIZED SIGNAL O
FIG. 25

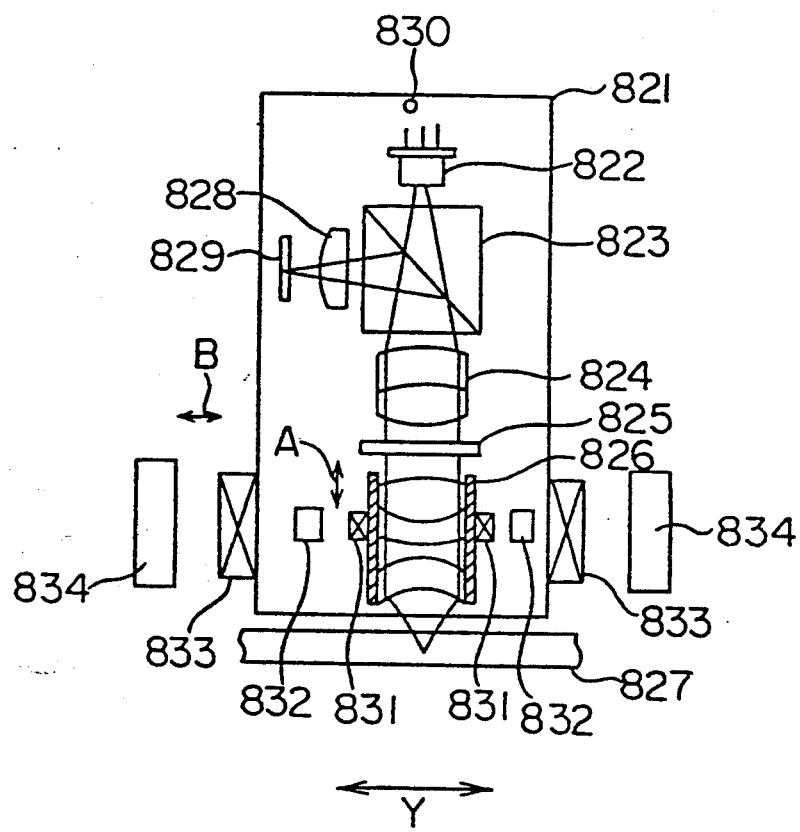
FIG. 29
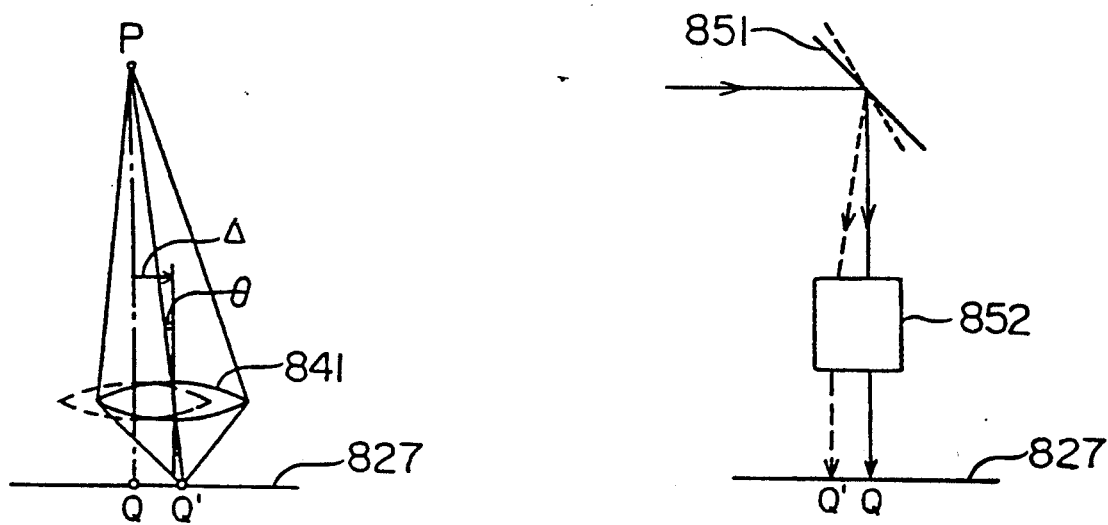
FIG. 31
FIG. 32

DATA RECORDING AND REPRODUCING APPARATUS FOR AN OPTICAL CARD

FIELD OF THE ART

This invention relates to a data recording and reproducing apparatus for an optical card, which is constituted to drive an optical card in a reciprocating manner in a direction parallel to tracks to conduct recording and reproducing of data.

BACKGROUND ART

As the present time is called a card age, cash cards, credit cards, and various other cards appear on the market. Most of them are magnetic recording cards and especially cards of the business card size, which are convenient in carrying, are very often used. However, since recording capacity is not so much assured in magnetic recording cards of such a size, it is the present state that they are only used to the extent of memorization of collation card, e.g., secret code, account number or registration number, etc. extremely restricted. In this respect, optical cards which optically record information have the merit that the information content recorded is far greater than that of conventional magnetic recording cards.

Such a system to record information onto an optical card to reproduce them therefrom is disclosed in, e.g., the Japanese Patent Application Laid-Open No. 137245/86 publication. In this system, the direction of a laser beam is controlled by two servo control mirrors, thus to carry out scanning of recording areas on the optical card. Further, a method is disclosed in the Japanese Patent Application Laid-Open No. 40325/84 publication to effect recording and reproducing while a vibrating laser beam in a direction vertical to the scanning direction of the optical card, and an actual mechanism for a scanning laser beam is disclosed in the Japanese Patent Application Laid-Open No. 214239/86 publication. In addition, a format for recording data onto an optical card with high efficiency is disclosed in the application No. JP86/00134 specification under the Patent Cooperation Treaty.

However, problems with the data recording and reproducing apparatus for an optical card conventionally known are as follows.

(1) For an optical disc, it is sufficient to carry out scanning by a laser beam by revolving the disc. In contrast, since it is necessary for an optical card to be scanned by a laser beam lengthwise and breadthwise, the mechanism of an optical system for scanning laser beam becomes complicated. In addition, the optical path of the laser beam becomes elongated, with the result that an optical aberration is likely to occur.

(2) The recording area on the surface of an optical card is likely to be subjected to adhesion of dust or scratched, with the result that reading errors may occur at the time of reproduction or playback.

(3) Since data is recorded in the order of $\mu m$ on the optical card, it is necessary to load the optical card at a correct position within the apparatus with the accuracy of $\mu m$ order. However, such an operation for loading the optical card is very troublesome in the conventional apparatus.

(4) In the optical card, a plurality of tracks are defined on the recording area to arrange pits along the tracks, thus to record information. For this reason, reproduction or playback is carried out while conducting a tracking control and a focusing control. However, since there is employed a system to conduct these controls while scanning the laser beam lengthwise and breadthwise in place of conducting them while revolving the disc as in the optical disc, the control system becomes extremely unstable.

(5) Since reading is conducted by scanning a laser beam lengthwise and breadthwise as described above, noise components are likely to be mixed into a read signal, so that reading in which noise components are eliminated is difficult.

(6) For a reading apparatus for an optical card, there is an apparatus of the type to conduct a reading of every bit trains using a line sensor. However, the apparatus of the type to scan using a laser beam to effect reading is not compatible with the apparatus using line sensor.

DISCLOSURE OF THE INVENTION

Objects of this invention are as follows.

(1) To provide a data recording and reproducing apparatus for an optical card, in which the mechanism of an optical system used in recording and reproduction or playback is relatively simple.

(2) To provide a data recording and reproducing apparatus for an optical card, which permits reproduction or playback free from error even if the surface of the optical card is subjected to adhesion of dust or scratched.

(3) To provide a data recording and reproducing apparatus for an optical card, which can easily load the optical card at a correct position within the apparatus.

(4) To provide a data recording and reproducing apparatus for an optical card, which permits stable tracking and focusing control operations.

(5) To provide a data recording and reproducing apparatus for an optical card, which can effectively eliminate noise components mixed in at the time of reproduction or playback.

(6) To provide a data recording and reproducing apparatus for an optical card, which is of the laser beam scanning type compatible with an apparatus of the type which conducts a reading using a line sensor.

The first feature of this invention resides in a data recording and reproducing apparatus for use in an optical card, on which a plurality of tracks are arranged in parallel, the apparatus comprising:

card supporting means for supporting the optical card, card drive means for reciprocating the card supporting means in a first direction, an optical head for selectively providing an access to respective tracks to irradiate light beam at a position above the optical card to conduct recording/reproducing of data, and head drive means for reciprocating the optical head in a second direction perpendicular to the first direction.

The second feature of this invention resides in that, in the above-described apparatus, guide sections are provided on both the ends of tracks of the optical card wherein when the optical head scans on the guide sections, the card drive means conducts acceleration and deceleration of the card supporting means.

The third feature of this invention resides in that there are further provided in the above-described apparatus, an error correcting code addition circuit for adding error correcting codes to a plurality of blocks obtained by dividing user data to be recorded, respectively, thereafter to reorganize the blocks to deliver the reorganized data to the optical head as data to be recorded, and an error correction circuit for applying a processing having an opposite relationship to the above-described reorganization to data read by the optical head to thereby reproduce the blocks before reorganization, thus to carry out a necessary correcting processing on the basis of the error correcting codes in the respective blocks.

The fourth feature of this invention resides in that, in the above-described apparatus, drive motors are provided in the card drive means and the head drive means wherein these drive motors are enveloped with a vibration proof metal and a vibration proof rubber, respectively.

The fifth feature of this invention resides in that, in the above-described apparatus, two vibration proof metal layers are provided to provide a vibration proof rubber layer between these layers.

The sixth feature of this invention resides in that, in the above-described apparatus, the card supporting means comprises pressing means for pressing the upper surface of the optical card, and positioning means which can be in contact with the side surface and away therefrom.

The seventh feature of this invention resides in that, in the above-described apparatus, the positioning means comprises a plunger slidably moving with respect to the body of the card supporting means, biasing means for applying a force in a direction allowing the plunger to be away from the side surface of the optical card, a pressure plate for applying a force in a direction allowing the plunger to be in contact with the side surface of the optical card, and a solenoid for driving the pressure plate.

The eighth feature of this invention resides in that there are further provided in the above-described apparatus, positioning means having a contact surface in contact with one side surface of the optical card on the card supporting means, thus to conduct a positioning of the optical card by the contact surface, and roller means having a rotation shaft slightly inclined with respect to a perpendicular set up on a plane including the above-described contact surface, and for introducing the optical card inserted from the outside onto the supporting means, the optical card inserted from the outside being introduced toward the contact surface due to the inclination of the rotation shaft.

The ninth feature of this invention resides in that there is further provided in the above-described apparatus, a control unit for carrying out a feedback control for the optical head in order to conduct a tracking control for allowing a beam irradiated from the optical head to be along the tracks on the optical card, and a focusing control for allowing the beam to be focused on the tracks, whereby after a drive speed of the optical card or the optical head by the card drive means or the head drive means has fallen below a predetermined value, a feedback signal is locked at a value immediately therebefore, thus allowing the control unit to be operative in accordance with an open loop control.

The tenth feature of this invention resides in that, in the above-described apparatus, there is provided electromagnetic drive means in the optical head to deflect the irradiated light beam in a second direction by the electromagnetic drive means, thus permitting scanning of the light beam.

The eleventh feature of this invention resides in that a binarization circuit used in a data recording and reproducing apparatus, which comprises:

an AC-DC conversion unit for carrying out a full-wave rectification of an input signal, an integration circuit for integrating an output from the conversion unit, a comparator circuit for making a comparison between an output level of the integration circuit and a reference level to produce an output when the output level of the integration circuit is larger than the reference level, a zero-crossing comparator for outputting a signal of a rectangular waveform which represents a high level when the input signal is positive and low level when the input signal is negative, and gate means for permitting an output of the zero-crossing comparator to pass therethrough only when the comparator circuit produces an output.

BRIEF DESCRIPTION OF THE DRAWINGS

FIG. 6 is a top view showing an example of an optical card used in the apparatus according to this invention, FIGS. 7 and 8(a), (b) and (c) are views showing a format of the optical card used in the apparatus according to this invention, FIGS. 9 and 10(a), (b) and (c) are views for explaining the principle for recording user data in the apparatus according to this invention, FIG. 16 is a block diagram of a typical tracking and focusing control system, FIG. 24 is a block diagram of a binarization circuit according to this invention, FIG. 25(a), (b) and (c) are a timing chart for explaining the operation of the circuit shown in FIG. 24, FIG. 29 is a structural view of an optical head of a data recording and reproducing apparatus of the laser beam scanning type which can carry out recording and reproducing of an optical card to which a format for line sensor is applied, and FIGS. 30 to 32 are views showing different mechanisms having a function equivalent to that of the optical head shown in FIG. 29.

BEST MODE FOR CARRYING OUT THE INVENTION

§1 Basic configuration of the apparatus

1.1 Basic configuration of a conventional apparatus

Prior to the description of the basic configuration of an apparatus of this invention, the basic configuration of a conventional apparatus will be explained in a sense of comparison.

Figure 1:
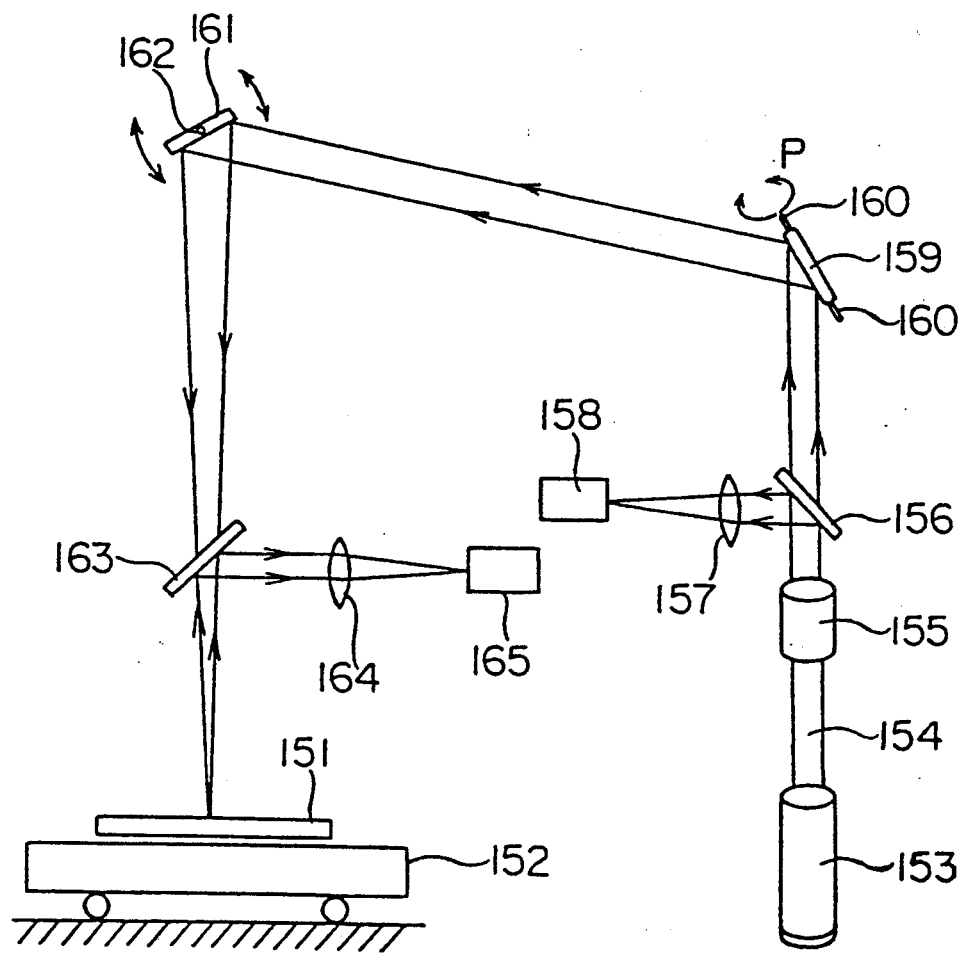
FIG. 1 is a view showing the basic configuration of a conventional data recording and reproducing apparatus for an optical card.

A data recording and reproducing apparatus shown in FIG. 1 is of the type which allows a card 151 to record data thereon, i.e., which scans the recording area surface of the card 151 by using a laser beam 154 generated from a light source 153 to thereby record or read a desired data. In this example, means for carrying the card 151 into the beam track is a holder 152. Means for scanning the beam on the card 151, which has been carried into the beam track, is servo control mirrors 159 and 161. The servo control mirror 159 is affixed so that it is rotated with a rotation shaft 160 being as an axis in a direction indicated by an arrow P, and serves to find out the edges in a lateral direction of a laser recording material in the rough mode of operation, and thereafter to identify a data track existing with it being spaced from the edge by a predetermined distance in the fine mode of operation. On the other hand, the servo control mirror 161 is affixed so that it is rotated about a rotation shaft 162, and serves to effect fine control of a movement of the beam along the length of the card 151. Accordingly, by movement of holder 152 and scanning by servo control mirrors 159 and 161, recording/reproducing of data are conducted at a desired address.

For light source 153, a laser diode laser is used in this example. In addition, a light emitting diode or a lamp, etc. may be used. In the case of recording, the recording surface is fused or melted by irradiating a high intensity light beam thereto.

Laser beams divided by the half mirror 156 are monitored by an optical detector 158 through a lens 157. Thus, confirmation of the beam intensity is made. At the time of reproduction or playback, a reflected light from the optical card 151 is detected by a light detector 165 through a half mirror 163 and a lens 164. Thus, presence and absence of pits are converted to an electric signal.

Meanwhile, since two servo control mirrors are provided in the above data recording and reproducing apparatus for optical card as previously described as the background art, the optical system is prolonged and a drive mechanism to carry out scanning by the optical system is necessary. Accordingly, because of ensurance of a necessary distance of the optical system and attachment of the drive mechanism, the structure becomes complicated and is difficult to make compact. In addition, the distance of the optical system is prolonged and there occur aberration and/or various optical problems resulting from the fact that lenses and mirrors are arranged to optically conduct a scanning. It will be seen that such problems are solved in the apparatus of this invention described below.

1.2 Basic configuration of an apparatus according to an embodiment of this invention Basic configuration of an apparatus according to an embodiment of this invention will be now described with reference to FIG. 2.

Figure 2:
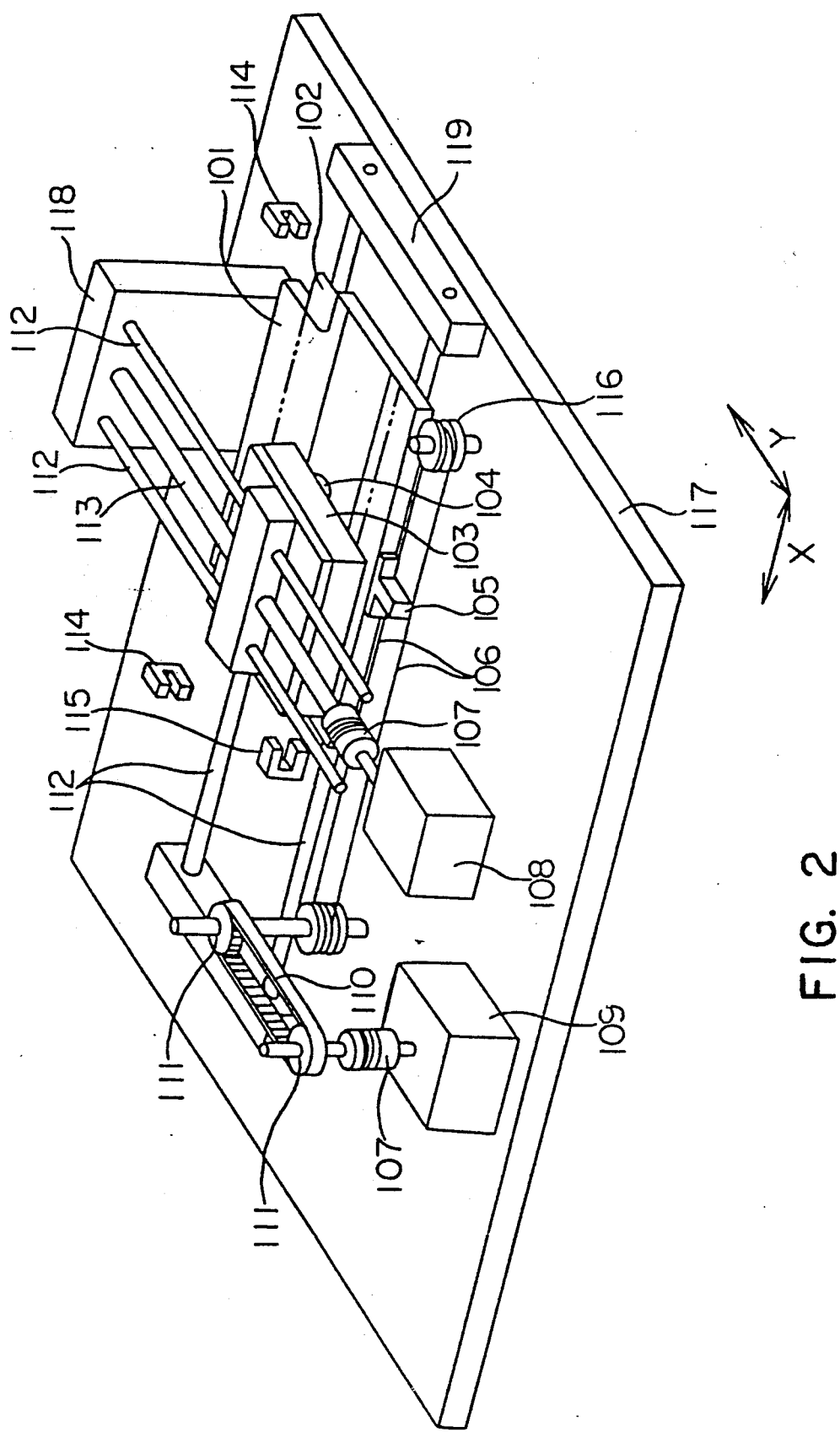
FIG. 2 is a perspective view of a data recording and reproducing apparatus according to an embodiment of this invention.

In FIG. 2, reference numeral 101 denotes a card holder, reference numeral 102 an optical card, reference numeral 103 an optical head, reference numeral 104 an objective lens, reference numeral 105 a wire holder, reference numeral 106 a wire belt, reference numeral 107 joints, reference numeral 108 a head drive motor, reference numeral 109 a stage drive motor, reference numeral 110 a timing belt, reference numeral 111 a timing pulley, reference numeral 112 guide shafts, reference numeral 113 ball screws, reference numeral 114 a position sensor, reference numeral 115 a sensor for control, and reference numeral 116 pulleys.

The card holder 101 for holding the optical card 102 is driven by the stage drive motor 109 to effect a reciprocating movement along the guide shafts 112. Means for transmitting a drive force is timing pulley 111, timing belt 110, pulleys 116, wire belt 106, and wire holder 105, and means for detecting the position of the card holder 101 in driving is position sensor 114. As described later, a plurality of tracks are provided on the optical card 102 along the length direction which is the movement direction. By laser beam emitted from the lens 104 of the optical head arranged above with respect to the tracks, recording and reproducing of data are conducted. The head drive motor 108 drives the optical head 103 through the ball screw 113 to carry out coarse tracking for the optical card 102 with a block being as a unit (a block consists of a plurality of tracks), and to move the objective lens 104 of the optical head 103 in the case of conducting fine tracking with a track being as a unit. While the card holder 101 moves in a reciprocating manner along the guide shafts 112, positioning of the optical head 103 is carried out by the head drive motor 108 with a block being as a unit in the recording area of the optical card 102. By moving and adjusting the objective lens 104 by the control mechanism, the final tracking is conducted. Thus, recording and reproducing of data are carried out.

As just described above, in this apparatus, the rough positioning control of laser beam is conducted by the movement of the card holder 101 and the optical head 103, and the fine control is conducted by the movement of the objective lens 104. Accordingly, the mechanism of the optical system used in recording and reproduction or playback becomes extremely simplified as compared to the conventional apparatus.

1.3 Operation control system of the apparatus

Figure 3:
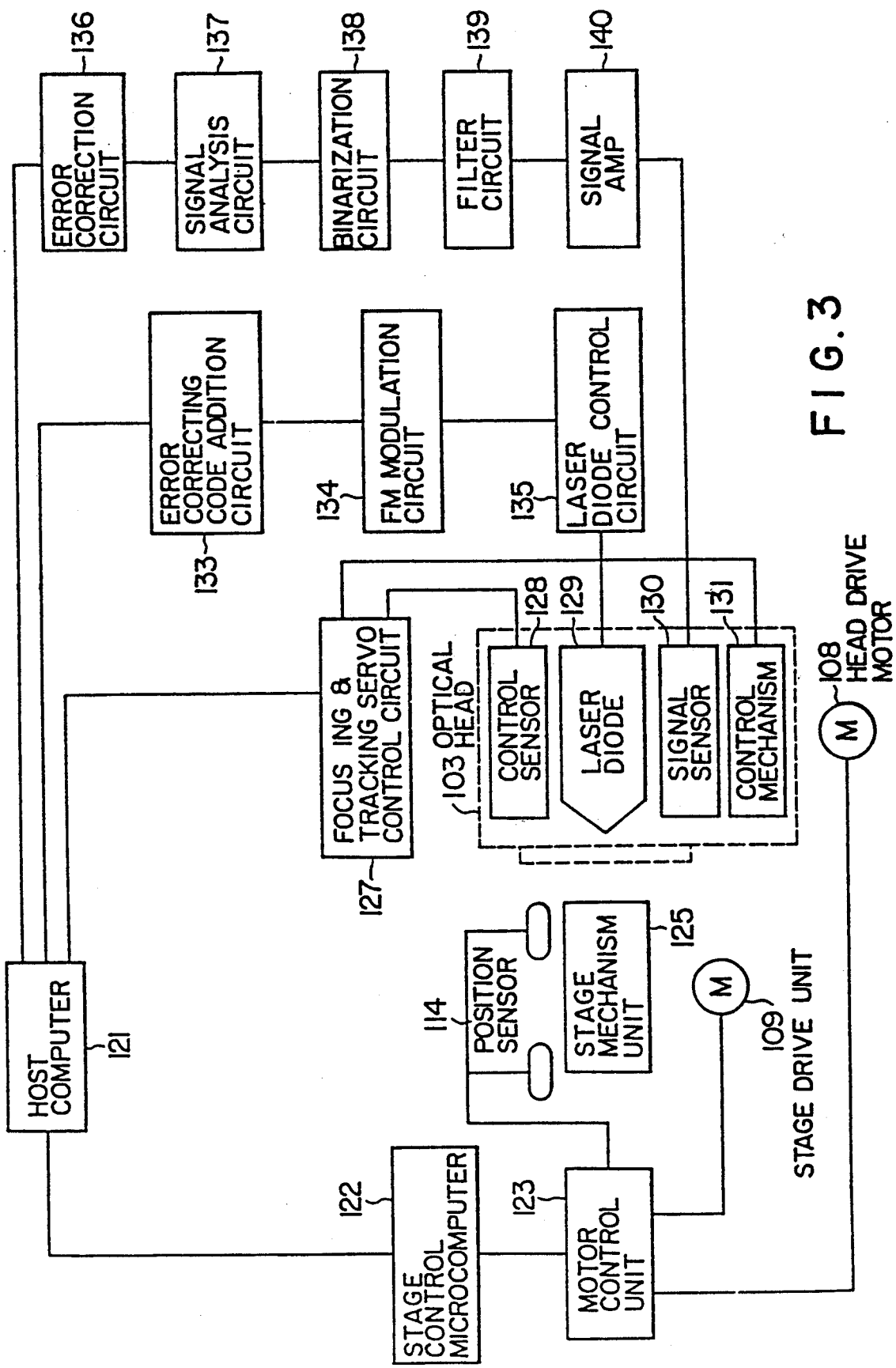
FIG. 3 is a block diagram of a control unit for controlling the operation of the apparatus shown in FIG. 2, FIGS. 4 and 5(a), (b) and (c) are flowcharts showing the processing by the control unit of FIG. 3.

The configuration of a control unit for conducting the operation control of the above-described apparatus is shown in FIG. 3 in a block form.

In FIG. 3, position sensor 114 is used for detection of position for acceleration/deceleration control and reciprocating inversion control in reciprocating drive by the stage drive motor 109. Optical head 103 is composed of a semiconductor laser 129, a signal sensor 130 for reading recording data, a control sensor 128 for focusing and tracking, an optical system (not shown) for detecting an error in focusing and tracking, and a control mechanism 131 for controlling the position of the objective 104 in order to conduct focusing and tracking. The entirety of the optical head 103 is driven by the head drive motor 108 in a direction perpendicular to the tracks of the optical card. In the case of conducting a tracking within the range of a block unit on the optical card, adjustment is made by the control mechanism 131 (i.e., only fine adjustment). On the other hand, in the case of conducting a tracking over one block unit, rough adjustment is made by the head drive motor 108 and fine adjustment is then made by the control mechanism 131.

A host computer 121 serves to supervise and control the entirety of the data recording and reproducing apparatus for optical card to give a command relating to rough adjustment of a drive system of a stage mechanism unit 125 (mechanism portion for driving the card holder 101 in FIG. 2) and the optical head 103 to a microcomputer 122 for stage control, and to give a command relating to a focus tracking to a focus tracking servo 127. In the case of recording data onto the card, recording data is delivered to the error correcting code addition circuit 133. On the other hand, in the case of reproducing data from the card, reproduced data is taken in through the error correction circuit 136.

The stage control microcomputer 122 delivers to the motor control unit 123 a position control signal of the head, a start/stop signal or a speed control signal of the stage mechanism unit 125 in accordance with a command of the host computer 121. The motor control unit 123 responds to this command to control the stage drive motor 109 while sensing the position of the card by the position sensor 114 to allow the running speed of the optical card to be constant to lessen the vibration of the running system of the optical card, and to control the head drive motor 108 to adjust the position of the optical head to a desired one.

The error correcting code addition circuit 133 serves to add error correcting codes to data so as to arrange bit trains in a distributed manner, thus to generate recording data resistant to burst errors as well. Because the detailed operation will be described later, brief explanation is made here. Namely, the error correcting code addition circuit 133 divides data trains delivered from the host computer 121 by a predetermined number of bits to add error correcting codes to the respective divided bit trains, thus to generate data with a block being as a unit. Then, they are distributed in accordance with a certain rule to edit bit trains recorded on the card. FM modulation circuit 134 serves to apply FM modulation to the bit trains. Means for controlling the semiconductor laser 129 on the basis of an output from the FM modulation circuit 134 is a semiconductor laser control circuit 135.

A signal analysis circuit 137 serves to execute a processing to analyze data recorded on tracks and regenerate such bit trains that are equivalent to the data outputted from the error correcting code addition circuit 133. To the signal analysis circuit 137, the bit trains are delivered, which are obtained by reading the recorded data at the signal sensor 130. The data signal from the sensor 130 is amplified at the signal amplifier circuit 140, and then the amplified signal is passed through the filter circuit 139, thereafter is binarized at the binalization circuit 138. The error correction circuit 136 serves to detect errors in bit trains using error correcting codes to correct error bits. The bit train data from which error correcting codes are eliminated after undergoing such a correction processing is transmitted as reproduced data to the host computer 121.

1.4 Operation of the apparatus

The outline of recording, reproducing and tracking operations in the system configuration shown in FIG. 3 will be now described.

Figure 4:
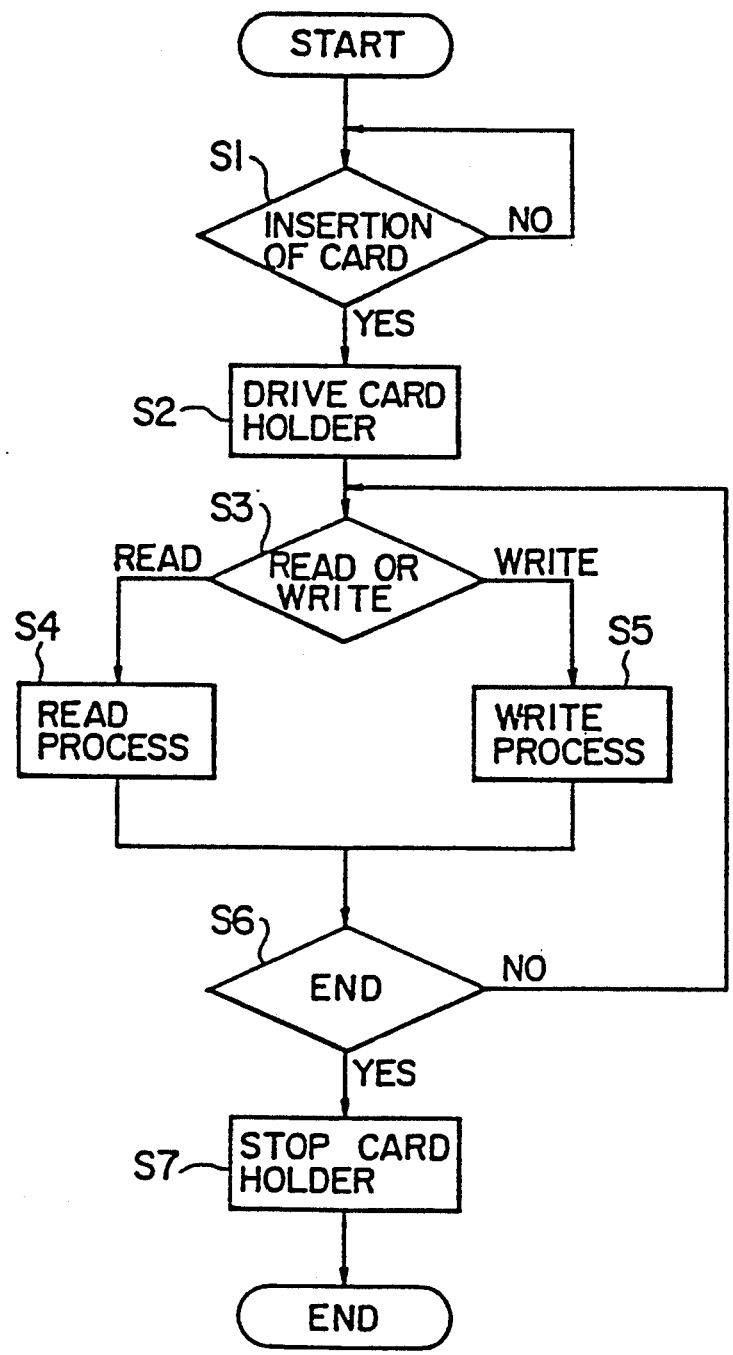

Initially, the flow of the entire processing will be described with reference to FIG. 4.

First is to wait until the optical card is inserted into the card holder (step S1). When the card is inserted, the card holder is driven (step S2). Whether the processing designated by user is read or write is examined (step S3). When read is designated, the processing for read process is carried out until data in the designated area are all reproduced (steps S4, S6), while when write is designated, the processing for write process is carried out until data of write instructions are all recorded (steps S5, S6), thus to stop the card holder to end the processing (step S7).

Figure 5A:
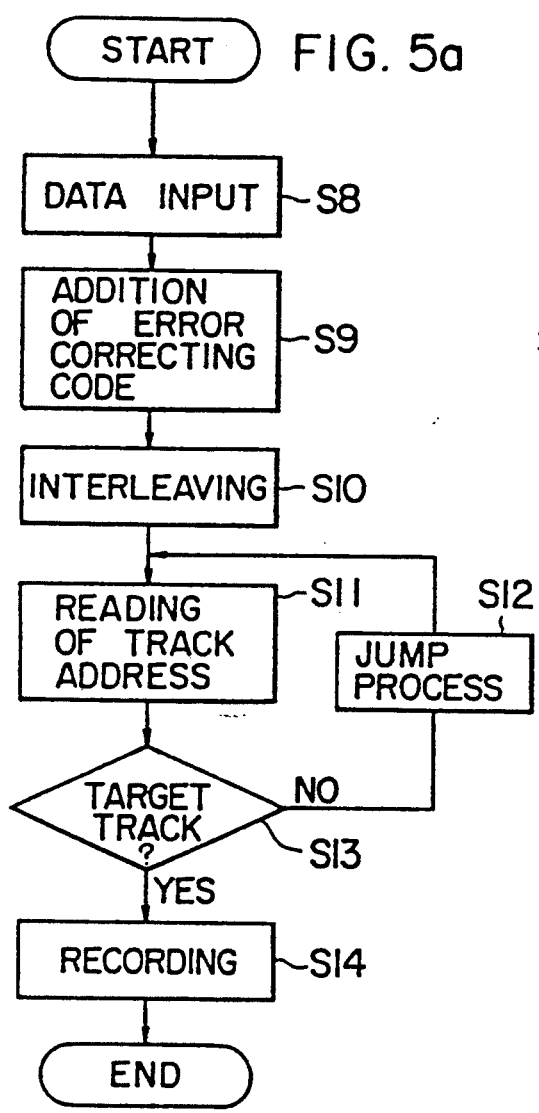

In the case of write process at the step S5, i.e., recording data onto the card, data train is inputted as shown in FIG. 5(a) (step S8) to send it by the host computer 121 to the error correcting code addition circuit 133, and to send a recording address (track address) to the stage control microcomputer 122 and to the focus tracking servo 127. Data train to be recorded onto the card is transmitted from the host computer 121 to the error correcting code addition circuit 133, at which the data train is divided every 174 bits to add error correcting codes of 82 bits to respective 174 bits using the difference set cyclic code method to generate blocks with 256 bits being as a unit (step S9). Then, such an interleaving work is conducted to further rearrange bit data of a block unit thus generated in a predetermined order which will be described later (step S10) to constitute different block trains comprised of bit data of respective blocks, thus to modulate them at the FM modulation circuit 134. The stage drive motor 109 and the head drive motor 108 are controlled by the motor control unit 123 in accordance with a track address (steps S11 to S13) and the optical head 103 is controlled by the focus tracking servo 127 to allow the semiconductor laser 129 to output recording data through the semiconductor laser control circuit 135 to thereby record data on the card (step S14).

Figure 5B:
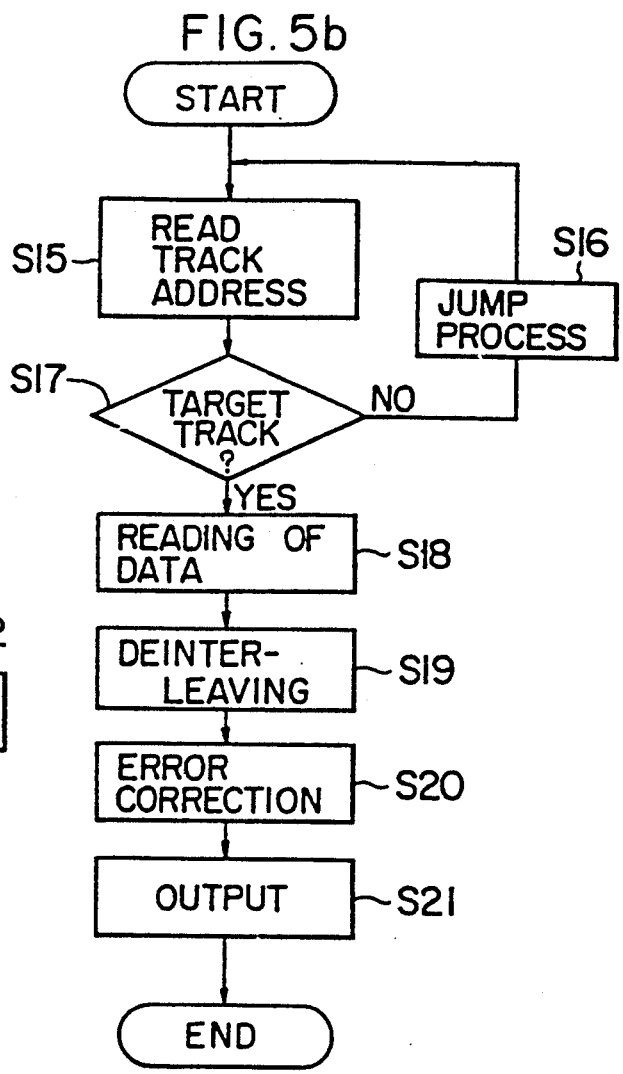

In the case of read process at the step S4, i.e., reproducing data having been recorded once on the card, a read address (track address) is sent to the stage control microcomputer 122 and the focus tracking servo 127 by the host computer 121 as shown in FIG. 5(b) and the semiconductor laser 129 is controlled in a regenerative mode through the semiconductor laser control circuit 135 (steps S15 to S17). Thus, recorded data is read from the track of the designated address by using the signal sensor 130 of the optical head (step S18). This read signal is first amplified at the signal amplifier circuit 140 and is subjected to noise elimination at the filter circuit 139, and is then binarized to a signal of "1" and "0" at the binarization circuit 138. Then, deinterleaving work for recomposing the binarized bit train so that it is changed to a bit train corresponding to the original information is carried out at the signal analysis circuit 137 (step S19). Then an examination and a correction of errors are conducted at the error correction circuit 136 (step S20). Finally, the data train from which the error correcting code is eliminated is sent to the host computer 121 (step S21).

Figure 5C:
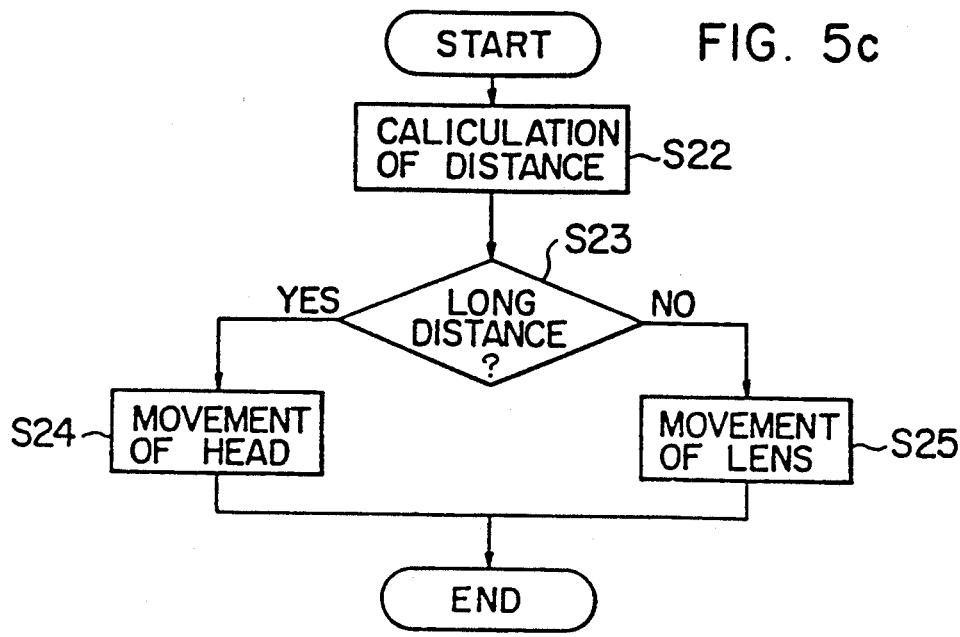

As described later, each track is provided with an ID section in which an address thereof is recorded. In the case where a track being read at present is not a track of the designated address, a distance up to the designated address is calculated from the present address having been read as shown in FIG. 5(c) (step S22) to adjust the position of the optical head so that it moves to the corresponding address section. In this case, when the distance is longer than a range adjustable by the control mechanism 131 (when judged YES at step S23), the head drive motor 108 is controlled through the stage control microcomputer 122 from the host computer 121 (step S24). On the contrary, when the distance is within the range adjustable by the control mechanism 131 (when judged NO at step S23), the lens is moved to make an adjustment (step S25).

As is apparent from the foregoing description, since this apparatus conducts a tracking by reciprocating the card holder which is holding the optical card, the card holder may be driven on the basis of a simple linear drive and the optical head may be subjected to tracking in a direction perpendicular to the reciprocating direction of the optical card. Namely, since tracking is carried out to conduct recording and reproduction or playback only by linear drives in both the directions without carrying out a two-dimensional optical scanning, it is possible to simplify the mechanism and to improve the control accuracy. In addition, by providing an access to tracks at respective strokes of the reciprocating movement of the optical card, useless operation can be eliminated in the recording and reproducing processing.

§2 Format of optical card 2.1 Information of prerecord

An example of a format of an optical card suitable for a data recording and reproducing apparatus according to this invention will be described. FIG. 6 is a top view of this optical card 200. Data are recorded on a recording region 210 in the optical card 200. In the recording region 210, a large number of elongated or narrow tracks 211 are formed in a lateral direction of the figure. Recording and reproducing of data are conducted by reciprocating this optical card 200 in a lateral direction of the figure to scan a laser beam along the tracks 211.

For this purpose, the recording region 210 is composed of an n number of tracks as shown in FIG. 7, wherein each track is composed of a guide section G, and an ID section I, a user area U, an end section E, and a guide section G in the order recited in a read direction, and a group of tracks to be read in a right direction and a group of tracks to be read in a left direction are mixed with each other. In this example, odd tracks are read from the left to the right and even tracks are read from the right to the left. Since read directions are different interchangeably, it is possible to read the first track up to the n-th track in sequence with good efficiency by the reciprocating movement of the optical card. In this example, guide sections G are formed as continuous grooves, e.g., having a length of 5 mm, and are used for securing stabilization of focusing or tracking when the optical card is accelerated or decelerated. Block addresses with a plurality of tracks being as a group and track addresses within blocks are prerecorded in ID sections I as information of tracks with they overlapping with each other. Information significant when reading a track concerned in an opposite direction is prerecorded in the end section E as termination information of tracks. Namely, in the case of reading a track in an opposite direction, the end section E comes immediately next to the guide section G. Thus, the system is informed at an early stage that the track is being read in an opposite direction. As described above, in this optical card 200, the direction from guide section G to ID section I is taken as a reading direction. Scanning of laser beam is accelerated or decelerated at the guide section G, and is maintained at a predetermined speed at ID section I, user area U, and end section E. It is to be noted that while reading directions are interchangeably set every tracks in order from the first track in the example shown in FIG. 7, such directions are not necessarily required to be set interchangeably. For example, in the case of an arrangement such that a plurality of heads are arranged to read a plurality of tracks at the same time, or in the case of an arrangement such that reading heads in a right direction and those in a left direction are arranged with they being spaced by a plurality of tracks, reading directions of a plurality of adjacent tracks may be the same, or reading directions may be the same simply in every block.

Further, in order to conduct tracking to effect recording and reproducing of a desired data while reciprocating the optical card, various information as described below are prerecorded into areas of the respective sections mentioned above. Namely, as shown in FIG. 8(a), ID section I is composed of Gap($FF_H$) for compensating operating time of hardware, Sync($OO_H$) successive thereto, AM1($FE_H$) including a missing clock and indicating that next data is address, Block and Track of 2 byte data indicating address, and CRCC for checking whether or not Block and Track are correctly read in. In addition, by prerecording a plurality of the same information with they overlapping with each other, a plurality of track retrievals are enabled during one reading operation. Moreover, as shown in FIG. 8(b), the user area is comprised of Gap($FF_H$), Sync($OO_H$), AM2($FB_H$) including missing clock and indicating that data recording section begins from the next, data recording section successive to Sync($OO_H$), and MG for absorbing recording error. This data recording section is a continuous area corresponding to 1024 bytes to form bits corresponding to the bit train using laser beam to record user data. As previously described, for allowing the end section E to have a meaning when reading in an opposite direction, this section is comprised of, from the side of the backward guide section, as shown in FIG. 8(c), Gap, Sync, AM3(FD$_H$) including missing clock and indicating that the section concerned is end section, and Gap.

2.2 Recording of user data

Figure 9:
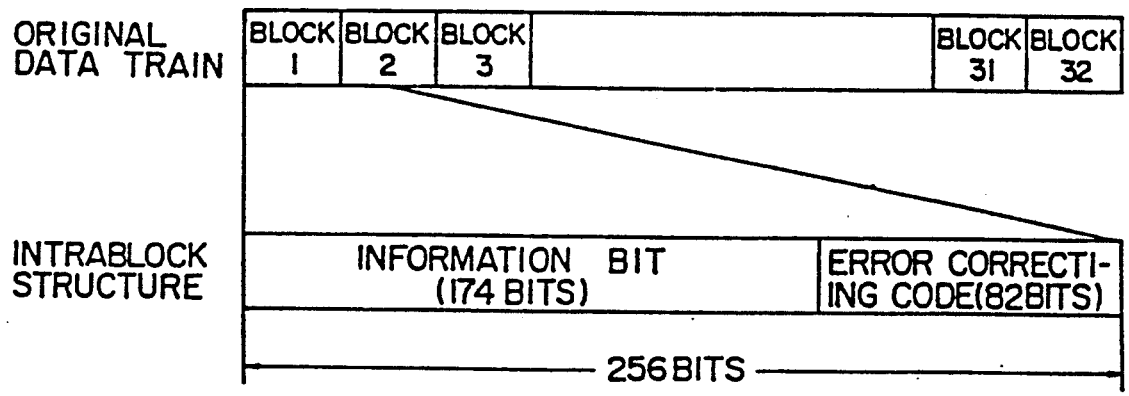

As described above, user data are recorded into user area U of respective tracks. Since an error is likely to occur in the optical card, it is also required for improving reliability of the system to adopt a data recording method resistant to error. To realize this, as shown in FIG. 9, original data to be recorded is constituted with, e.g., 32 blocks and each block is comprised of information bits of 174 bits and error correcting code of 82 bits corresponding to the information bits. The first to the 32-th blocks are arranged as shown in FIG. 10(a), and bits of the first block are assumed as "1-1", "1-2", ..., "1-256", bits of the second block as "2-1", "2-2", ..., "2-256", bits of the i-th block as "i-1", "i-2", ..., "i-256", respectively.

Figures 10A, 10B, 10C:
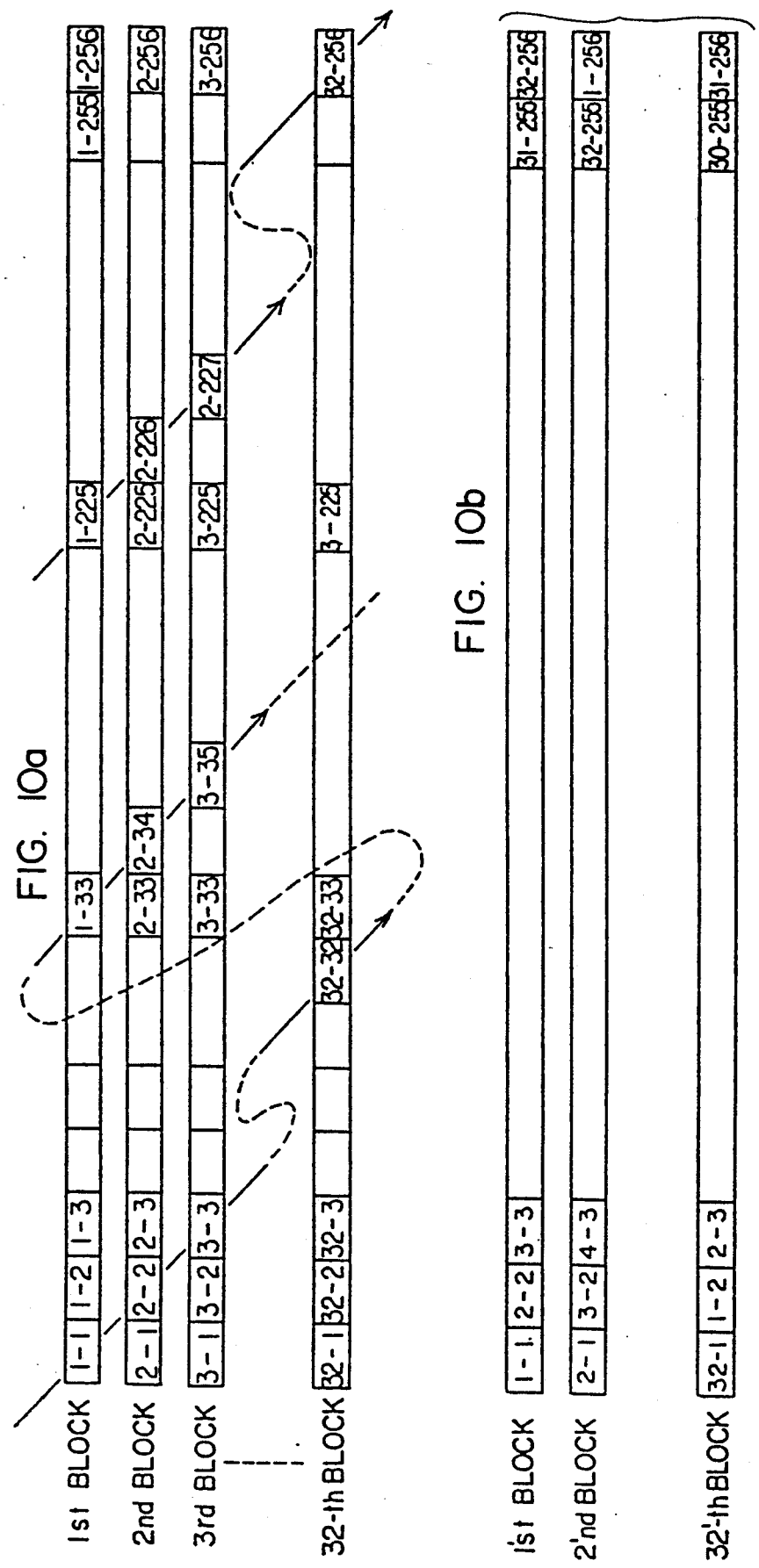

As shown in FIG. 10(b),

① Bit train starting from the 1st bit "1-1" of the 1st block and including the 2nd bit "2-2" of the 2nd block, ... the i-th bit "i-i" of the i-th block, ... the 32-th bit "32-32" of the 32-th block, the 33-th bit "1-33" of the 1st block, ... the 256-th bit "32-256" of the 32-th block is assumed as the 1'st block.

② Similarly, bit train starting from the 1st bit "2-1" of the 2nd block, bit train starting from the 1st bit "i-1" of the i-th block, and bit train starting from the 1st bit "32-1" of the 32-th block are assumed as the 2'nd block the i'-th block, and the 32'-th block, respectively. As shown in FIG. 10(c), data train comprising the 1'st block, the 2'nd block, ... the i'-th block, ... the 32'-th block arranged in order recited is assumed as a unit data train recorded on an actual card.

By executing such an interleaving processing, even in the case where data is broken over several ten bits in the recording data train of FIG. 1(c), so that burst error occurs, since those errors are considered as only an error of several bits in respective blocks when viewed in terms of the original data trains of FIG. 9, it is possible to carry out correction processing such error by an error correcting code. Thus, information can be reproduced and used without hindrance.

It is to be noted that the format of this optical card is not limited to the above-described embodiment, but may be changed or modified in various manners. While such interleaving processing to distribute bits to be recorded at intervals of the number of blocks plus 1 bit is carried out in the above-described embodiment, they may be allocated to specific bit positions of respective blocks in which positions of respective bits are actually recorded. Namely, bits originally belonging to the 1st block are assumed as bit 1, bit 33, bit 65, ... of respective blocks used for actual recording, it is sufficient to select bit 1, bit 33, bit 65, ... of recording blocks by using hardware such as a multiplexer, thus permitting deinterleaving processing to be faster. In a manner as described above, a scheme may be used to execute interleaving processing at intervals of the number of blocks or other intervals to distribute bits to be recorded. In addition, it is of course that the number of bits constituting one block may be changed according to the system scale or size.

As just described above, the data recording and reproducing apparatus according to this invention has interleaving and deinterleaving functions to divide bit train data to be recorded into a predetermined number of bit units to add error correcting codes every bit units to constitute a plurality of data blocks, thus making it possible to reconstruct information of a block unit with a high precision, resulting in an improved reliability of the system.

§3 Vibration proof structure of the drive mechanism 3.1 Occurrence of vibration

In §1, the basic configuration of the apparatus according to this invention has been described with reference to FIG. 2. One feature of this apparatus resides in that card holder 101 and optical head 103 make reciprocating movements, respectively. However, the reciprocating movement has the problem that vibration is likely to occur as compared to the revolving movement. Particularly, vibration may considerably occur in the drive source of the reciprocating movement, thus giving a serious bad influence to the operation that the optical system within the optical head follows tracks on the optical card.

Namely, because head drive motor 108 and stage drive motor 109 reciprocate optical head 103 and card holder 101 in the apparatus shown in FIG. 2, respectively, they frequently repeat forward rotation and backward rotation, giving rise to peculiar vibration at the time of transition from forward rotation to backward rotation and vice versa. On the other hand, objective lens 104 of the optical head 103 moves while repeating a fine adjustment for positioning of tracks. Because such a movement frequency and the vibration frequency are nearly equal to each other, resonant phenomenon takes place, resulting in the problem that the optical head 103 comes off the heads.

3.2 Embodiment of vibration proof structure

Figure 11:
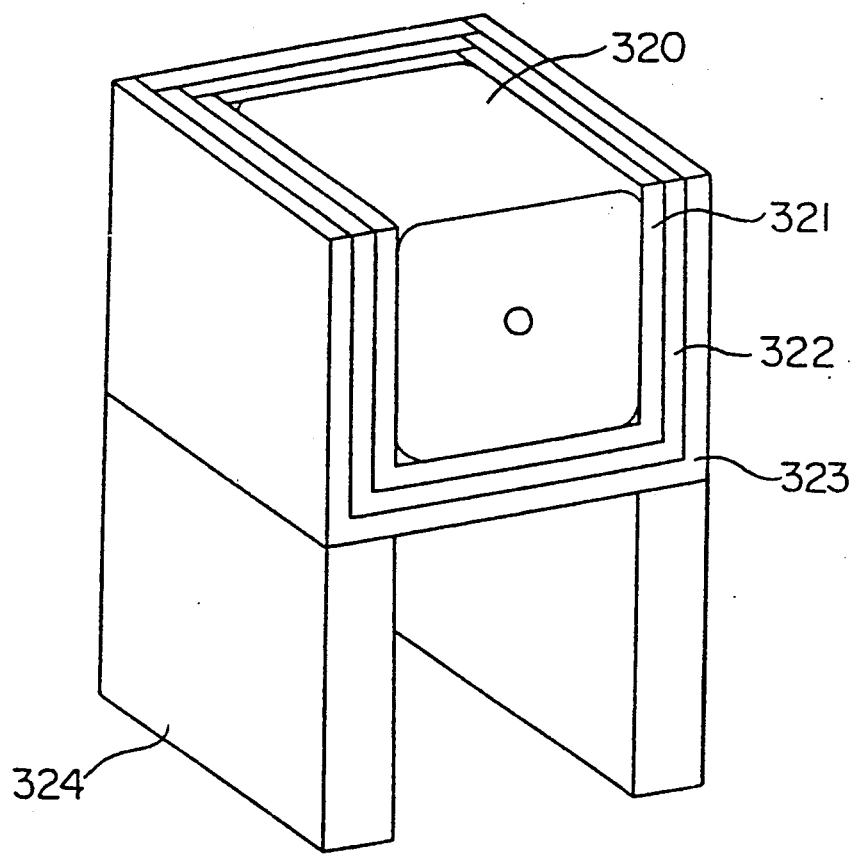
FIG. 11 is a view showing a vibration proof structure of a drive motor in the apparatus according to this invention.

For elimination of bad influences due to such vibrations, a vibration proof structure is implemented to the drive motor. An example of such a vibration proof structure is shown in FIG. 11.

A drive motor body 320 is enclosed with a vibration proof metallic plate 321 and is further enclosed with a vibration proof rubber 322. The drive motor body 320 thus enclosed is inserted into a vibration proof metallic case 323 and is fixed therewithin. Moreover, vibration proof metallic supporting legs 324 for height adjustment are fixed at the lower portion of the case 323. For these vibration proof metals, e.g., aluminum die casting (trade name: COSMARL) by Mitsubishi Kinzoku Kabushiki Kaisha may be used. Since vibrations of high frequency components are absorbed by plate 321, case 323 and supporting legs 324 which are made of vibration proof metal and vibrations of low frequency components are absorbed by vibration proof rubber 322, the problem of bad influence due to vibration is eliminated, thus making it possible to conduct a positioning of the optical head.

In addition to the vibration proof measure taken for the above-mentioned vibrating unit, various measures may be taken. For example, supporting table 117, optical head supporting pole 118, and guide shaft mounting members 119, etc. in FIG. 2 may be made of vibration proof metal. Also in the drive force transmission system comprising timing belt 110 and wire belt 106, a vibration absorbable arrangement is employed.

It is to be noted that this invention is not limited to the above-mentioned embodiment, but may be altered or changed in various manners.

While a sandwich structure such that vibration proof rubber is held between two vibration proof metals is employed in the embodiment of FIG. 11, the number of vibration proof metals and that of vibration proof rubbers are not limited to those in the above embodiment, respectively. For example, there may be employed an arrangement such that member subject to vibration proof is encompassed by a single vibration proof metal and a single vibration proof rubber.

When respective drive motors are enclosed with the vibration proof metal and the vibration proof rubber as described, vibrations of high frequency components are absorbed by the vibration metal and vibrations of low frequency components are absorbed by the vibration proof rubber, thus making it possible to reduce vibrations of the drive source and to precisely carry out positioning of the optical head.

§4 Positioning mechanism of the optical card 4.1 Basic configuration

Figure 12A:
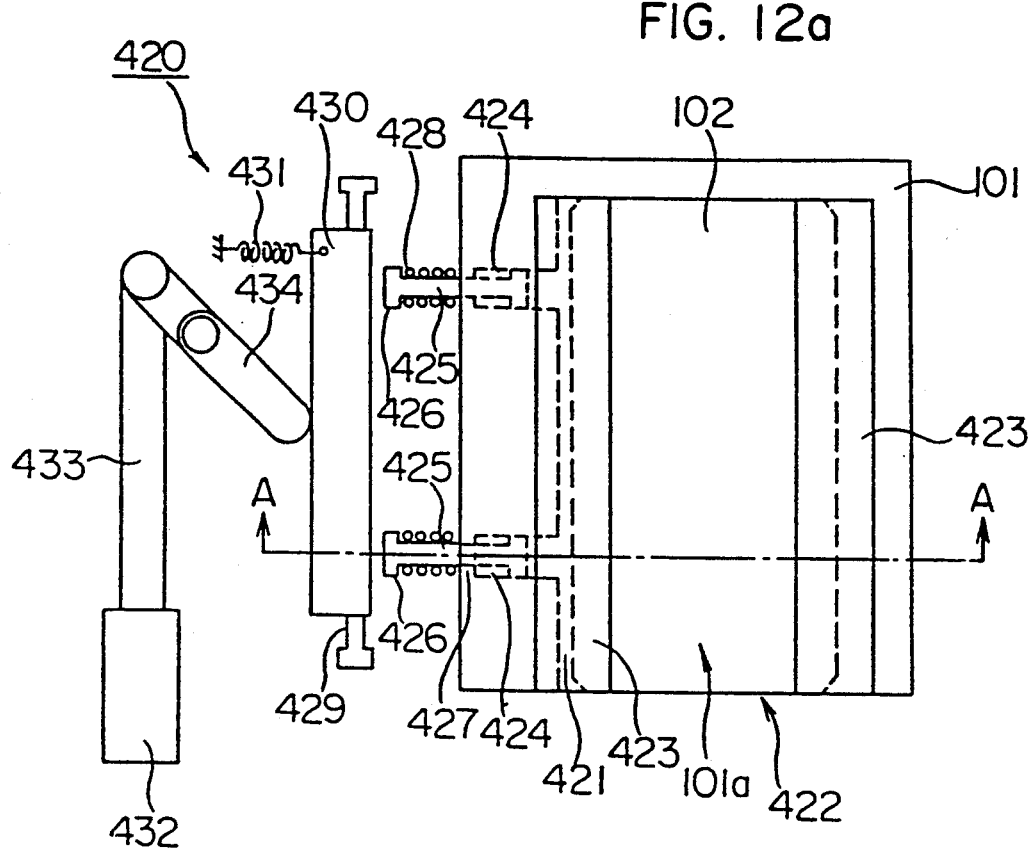
FIG. 12(a) is a top view of a mechanism for carrying out positioning of the optical card according to this invention.
Figure 12B:
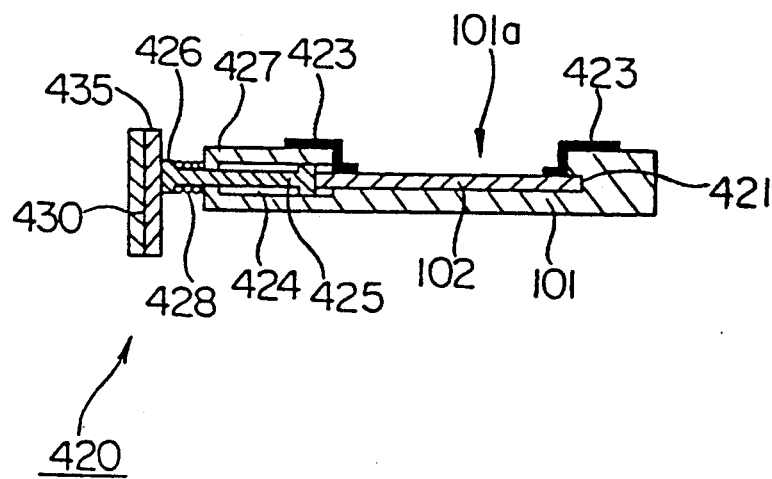
FIG. 12(b) is a cross sectional view taken along the lines A thereof.

The apparatus shown in FIG. 2 is an apparatus adapted to carry out recording and reproducing of the optical card 102 mounted on the card holder 101. For allowing this apparatus to be practical, it is required to precisely conduct a positioning of the optical card 102 on the card holder 101. An embodiment of a mechanism for such a positioning is shown in FIG. 12. FIG. 12(a) is a top view of card holder 101 of the apparatus shown in FIG. 2 and positioning mechanism 420 applied thereto, and FIG. 12(b) is a cross sectional view taken along the lines A—A thereof.

An opening 101a is formed on the side of the upper surface of the card holder 101 and an insertion groove 421 for inserting the optical card 102 in the card holder 101. The width in a lateral direction of the insertion groove 421 is formed so that it is larger than that of the optical card 102. The optical card 102 is inserted into the insertion groove 421 from an insertion pocket 422 provided in front of the card holder 101. A pair of leaf springs 423 are affixed toward the opening 101a on the upper surface of the card holder 101 to press both the side portions of the optical card 102 downwardly, thus to maintain planarization of the optical card 102.

Two penetration holes 424 and 424 communicating with the insertion groove 421 are formed on the side of the side surfaces in a longitudinal direction of the card holder 101 and a plunger 425 is disposed within the penetration hole 424. Large diameter portions 426 are provided on both the ends of the plunger 425 and a projecting portion 427 is formed at the exit portion of the penetration hole 424, thus preventing the plunger 425 from slipping or falling from the card holder 101. A spring 428 is fitted between one large diameter portion 426 of the plunger 425 and the card holder 101, thus biasing the plunger 425 to the side surface of the card 102 in an opposite direction.

On the other hand, a pressure plate 430 axially supported by a rotation shaft 429 with it being opposite to the plunger 425 is provided. This pressure plate 430 is biased in a direction allowing it to be away from the plunger 425 in a normal state. When the solenoid 432 is energized, the pressure plate 430 rotates against the spring 431 by the action of the piston 433 and the link mechanism 434 to press the plunger 425. Further, reference numeral 435 denotes a dumper provided at the pressure plate 430. In addition, FIGS. 12(a) and (b) show a normal state and a pressing state, respectively.

4.2 Operation of the positioning mechanism

The operation of the positioning mechanism 420 will be described on the basis of the above-mentioned configuration. First, optical card 102 is inserted from the insertion hole 422 of the card holder 101. The optical card 102 may be inserted by manual operation, or may be inserted by an automatic carrying mechanism (not shown). In this condition, since the solenoid 432 is not energized and the pressure plate 430 is positioned away from the plunger 425, the plunger 425 is positioned in a direction caused to be away from the optical card 102. Accordingly, the optical card 102 is pressed down by the leaf spring 423. As a result, the planarization is maintained, but parallelism with respect to the scanning direction (the longitudinal direction of the insertion groove 421) is not maintained.

When the card 102 is completely accommodated into the insertion groove 421, this is detected by a sensor (not shown) to energize the solenoid 432. Thus, the pressure plate 430 rotates against the spring 431 by the action of the piston 433 and the link mechanism 434 to press the plunger 425 to force the optical card 102 down to the side surface of the insertion groove 421, thus maintaining the parallelism with respect to the scanning direction. Then, when the solenoid 432 is automatically turned off, the pressure plate 430 comes off the plunger 425. As a result, the plunger 425 moves in a direction caused to be away from the optical card 102 by the spring 428. Thus, the card holder is placed in the state where it can be reciprocated in the scanning direction.

It is to be noted that this invention is not limited to the above-mentioned embodiment, but may be altered or changed in various manners. While the optical card is forced down by the plunger 425 in the above-mentioned embodiment, for example, such a mechanism to insert the plate from the gap of the card holder may be adopted.

In the data recording and reproducing apparatus for optical card according to this invention, when recording and reproducing or playback of the optical card are carried out, the optical card is driven in a reciprocating manner in a direction parallel to tracks by the card drive means to allow the optical card to conduct focusing and tracking thereabove to carry out recording/reading of the optical card. Accordingly, it is important to secure planarization and parallelism with respect to the scanning direction of the optical card. In accordance with the above-described mechanism, the optical card 102 is held down by the leaf spring 423 as shown in FIG. 12, whereby its planarization is maintained. In addition, since the pressure plate 430 rotates against the spring 431 by energization to the solenoid 432 to press the plunger 425, thus to force the card 102 down to the side surfaces of the insertion groove 421, parallelism with respect to the scanning direction is also maintained.

§5 Optical card automatic loading mechanism 5.1 Basic configuration

Figure 13:
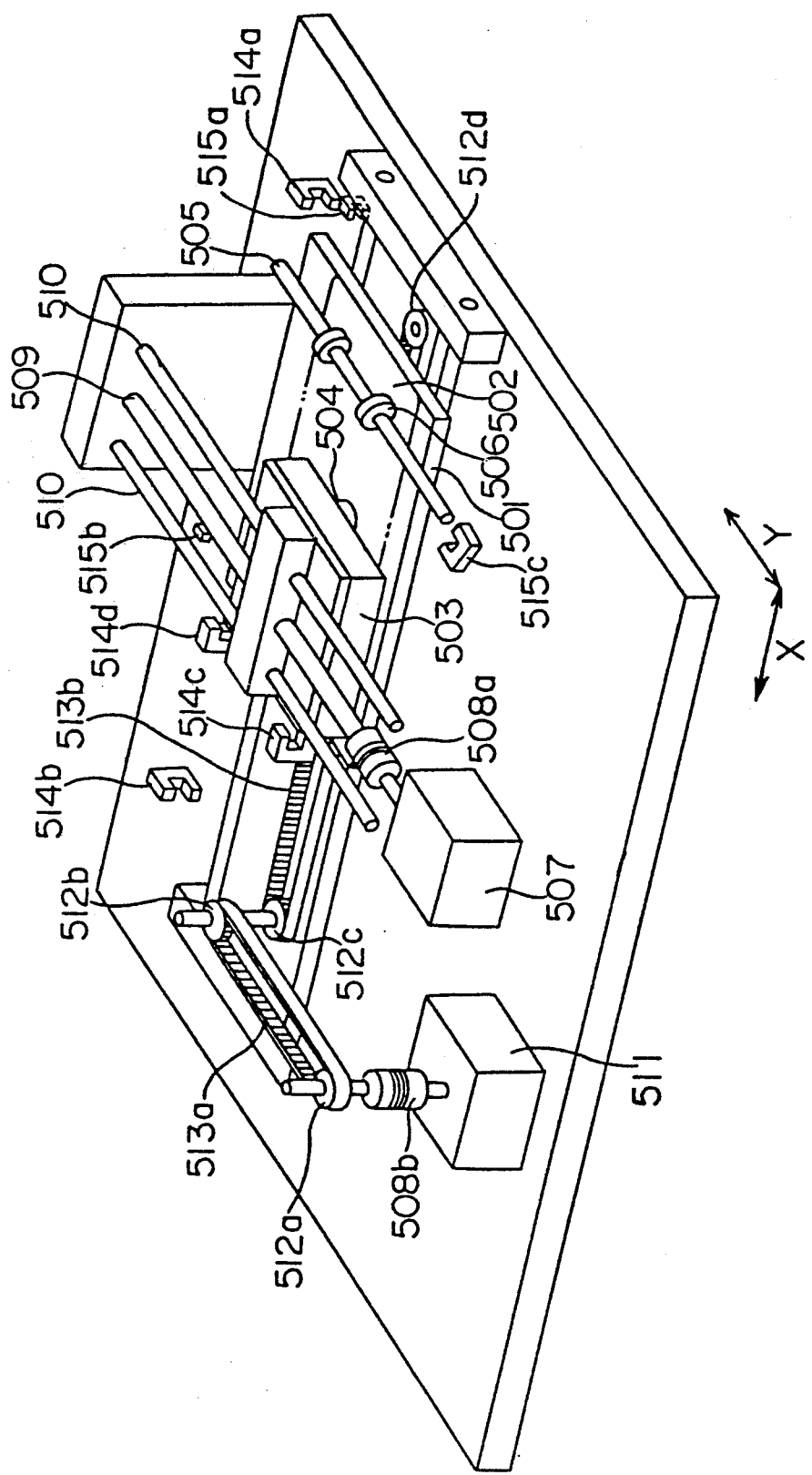
FIG. 13 is a perspective view showing the basic configuration of a data recording and reproducing apparatus for an optical card provided with an automatic loading mechanism for optical card.

FIG. 13 is a perspective view showing the basic configuration of a recording and reproducing apparatus for an optical card provided with an optical card automatic loading mechanism. This apparatus basically performs an operation similar to that of the apparatus shown in FIG. 2, but differs from the latter in that the function to automatically load an optical card is added. By this additive function, it is possible to easily load the optical card at a correct position within the apparatus.

The state where an optical card 502 (indicated by double dotted lines) is set on a card holder 501 is shown in FIG. 13. An optical head 503 is disposed above the optical card 502. A light beam for recording and reproduction or playback is irradiated onto the optical card 502 through the objective lens 504 provided at the lower surface of the optical head 503. For loading the optical card 502 onto the card holder 501, rollers 506 rotating about a rotation shaft 505 is provided. The rotation shaft 505 is pressed downwardly by means of a spring member (not shown). Thus, optical card 502 inserted from the right in the figure is loaded onto the card holder 501 by rotation of the roller 506 while being held between the roller 506 and the card holder 501.

A head drive unit 507 rotationally drives a ball screw 509 through a joint 508a. On both the sides of the ball screw 509, guide shafts 510 are provided. By the rotation of the ball screw 509, the optical head 503 slidably moves along the guide shafts 510. On the other hand, a stage drive unit 511 rotates a timing pulley 512a through a joint 508b. This rotation is transmitted to a timing belt 513b through a timing belt 513a and timing pulleys 512b and 512c. Since a portion of the timing belt 513b is connected to the lower surface of the card holder 501, rotation of the timing belt 513b moves the card holder 501 in a longitudinal direction of the timing belt 513b.

As stated above, since the optical head 503 and the card holder 501 are moved by drive units 507 and 511, respectively, and their movement directions are perpendicular to each other, light beam from the objective lens 504 can scan an arbitrary position of the optical card 502 on the card holder 501. For detecting that the card holder 501 has just reached both ends of the movement range, sensors 514a and 514b are provided. For detecting that the optical head 503 has just reached both ends of the movement range, sensors 514c and 514d are provided. In addition, for effecting a control to automatically load the optical card onto the card holder 501, sensors 515a, 515b and 515c are provided. Functions of these sensors will be described later.

Figure 14A:
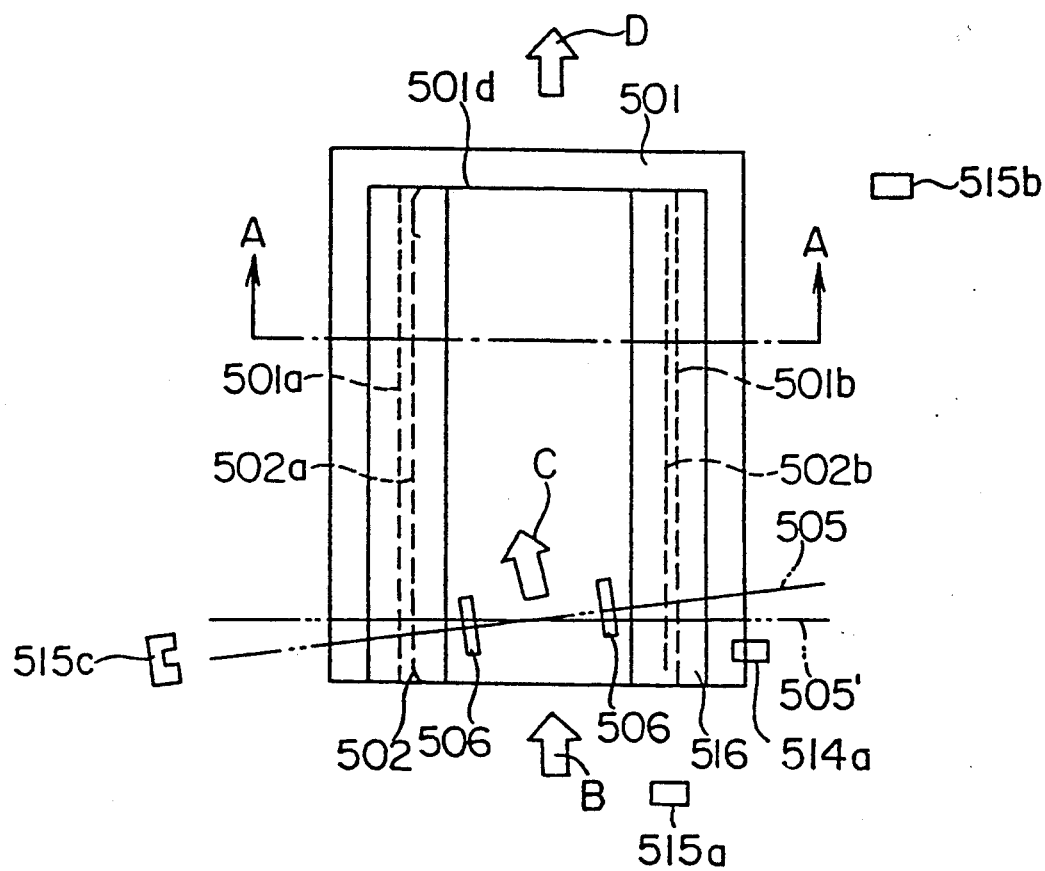
FIG. 14(a) is a top view of the automatic loading mechanism for optical card according to this invention.
Figure 14B:
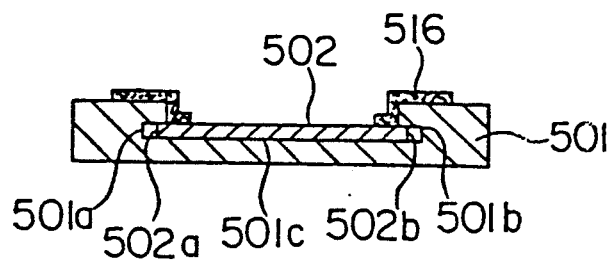
FIG. 14(b) is a cross sectional view taken along the lines A—A thereof, FIG. 15(a) and (b) are a view showing the arrangement of tracks on the optical card used in this invention and the scanning direction thereof.

The optical card automatic loading mechanism in this apparatus will be now described with reference to FIG. 14. FIG. 14(a) is a top view of a portion in the vicinity of the card holder 501 of the apparatus shown in FIG. 13 and FIG. 14(b) is a side cross sectional view cut along the cutting lines A—A of FIG. 14(b). As shown in FIG. 14(b), a state surface 501c for mounting the optical card 502 and contact surfaces 501a and 501b covering both the side surfaces 502a and 502b of the optical card 502 are provided on the card holder 501. The distance between contact surfaces 501a and 501b is slightly larger than the width of the optical card 501. A design is made such that small plays (e.g., about 1 mm, respectively) can be present on both the sides of the optical card 501 with the optical card 502 being mounted on the stage surface 501c. Moreover, for securely holding the optical card 502 on the stage surface 501c, a pressing plate 516 for pressing both the side portions of the upper surface of the optical card 502 from the upward direction is provided.

The feature of this apparatus resides in that rotation shaft 505 of rollers 506 for introducing the optical card 502 is slightly inclined with respect to a perpendicular 505' set up on the contact surface 501a (e.g., about 1 to 2 degrees), as shown in FIG. 14(a). It is now assumed that rollers 506 are rotated while inserting the optical card 502 from the direction indicated by an arrow B of FIG. 14(a). The optical card 502 thus inserted is held between the stage surface 501c and the lower surface of the roller 506 and is then pulled toward the back on the stage surface 501c. In this instance, since the rotation shaft 505 of the roller 506 is slightly inclined, the optical card 502 is pulled or drawn in a direction indicated by an arrow C in the figure. Namely, the optical card 502 is pulled or drawn toward the contact surface 501a. The side surface 502a of the optical card 502 shortly comes in contact with the contact surface 501a and is then pulled or drawn onto the stage surface 501c with it being in contact therewith. At the back side of the card holder 501, a contact surface 501d is provided. Thus, the optical card 502 is stopped with it being in contact with the contact surface 501d. Eventually, the front end suface becomes in surface-contact with the contact surface 501d and the side surface 502a thereof becomes in surface-contact with the contact surface 501a. Thus, precise positioning of the optical card 502 with respect to the card holder 501 is carried out.

5.2 Actual operation of the automatic loading mechanism

The principle of the operation of the automatic loading mechanism employed in this apparatus has been described above. In actuality, an automatic loading will be carried out in accordance with the following steps by using detection signal from the sensors. Initially, when the user inserts optical card 502 from an insertion pocket (not shown) of the entirety of the apparatus, the front end portion of the optical card 502 comes to the front end of the stage surface 501c. When sensor 515a senses that the front end of the optical card 502 has approached, rollers 506 begin rotating by drive means which is not shown.

When it is sensed by sensor 515b (a sensor capable of sensing the front end of the optical card 502 from a remote position in this example) that optical card 502 has been drawn onto the stage surface 501c and the front end portion thereof has reached the contact surface 501d, the card holder 501 itself moves in a direction indicated by an arrow D in the figure by means of drive unit 511. At this time, if movement speed of the card holder 511 is caused to be equal to a speed at which optical card 502 is drawn in by rollers 506, there is no possibility that rollers 506 slip on the upper surface of the optical card 502. When the card holder 501 on which the optical card 502 is mounted moves in the direction indicated by arrow D, rollers 506 are out of place from the upper surface of the optical card 502 and are then lowered by a spring force which is not shown. Downward movement of the rotation shaft of the rollers 506 is sensed by sensor 515c. By this detection, rotation of the rollers 506 is stopped. The card holder 501 which has moved in the direction indicated by arrow D is stopped at a predetermined position where it is to be subjected to scanning by optical head 503.

An embodiment of the automatic loading mechanism according to this invention has been described. In short, this invention may be realized with any structure as long as there is employed an arrangement such that a contact surface is provided on the optical card holding means to introduce the optical card by roller means having an inclined rotation shaft so that one side surface of the optical card becomes in contact with the contact surface, thus making it possible to carry out an automatic loading of the optical card and a precise positioning.

§6 Control system of the optical head 6.1 Causes allowing the control to be unstable Optical disc carries out recording and reproducing of data on the tracks while revolving the disc. On the contrary, optical card carries out recording and reproducing of data on the tracks while moving the card lengthwise and breadthwise. Such a longitudinal and lateral movement has a nature allowing the control system for tracking and focusing to be unstable as compared to the rotation movement. The causes of such an unstability will be first described in more detail.

In FIG. 15, an optical card 601 reciprocates in an X-direction (in the length direction of tracks 602) and scanning on one track is carried out by an optical head 603. In addition, the optical head 603 moves in a Y-direction, thus permitting scanning over all the tracks. Scanning in X-direction in this case is as follows: acceleration is made from the state where the speed is zero; when the speed has reached a predetermined one, scanning is conducted at a constant speed; deceleration is made until the speed reaches zero; such an operation repeat at times subsequent thereto to conduct a reciprocating scanning, and recording and reproduction or playback are carried out under a condition of constant speed. Symbols A and B in the figure indicate the position where acceleration is completed or the position where deceleration is initiated. Thus, tracking control and focusing control are carried out while conducting such a scanning.

FIG. 16 is a block diagram showing the schematic configuration of such a control system wherein reference numeral 611 denotes an amplifier, reference numeral 612 a driver, reference numeral 613 an objective actuator, reference numeral 614 an error detection system, and reference numeral 615 an error amplifier.

In the figure, an objective lens (not shown) forming the head is driven by the objective lens actuator 613 and tracking error and focusing error of the objective lens are detected by the error detection system 614. Detection of tracking error may be made by, e.g., wobbling method to infinitesimally vibrate beam spot with respect to tracks to detect an envelope of amplitude modulation applied to an output of an optical detector which detects reflected light from the tracks at this time. In addition, detection of focusing error may be made by, e.g., beam eccentric method in which incident light axis of beam is slightly inclined with respect to the objective light axis and the recording surface to detect movement of reflected light axis resulting from changes in spacing between the recording surface and the optical head by using a bisected optical detector disposed in the vicinity of image formation surface of reflected light. A detection signal from the error detection system 614 is amplified at error amplifier 615 and is then added as an error signal E to a set value P (in this case, P=0), resulting in a servo signal S. This servo signal S is fed back to objective actuator 613 through amplifier 611 and driver 612.

Figure 17:
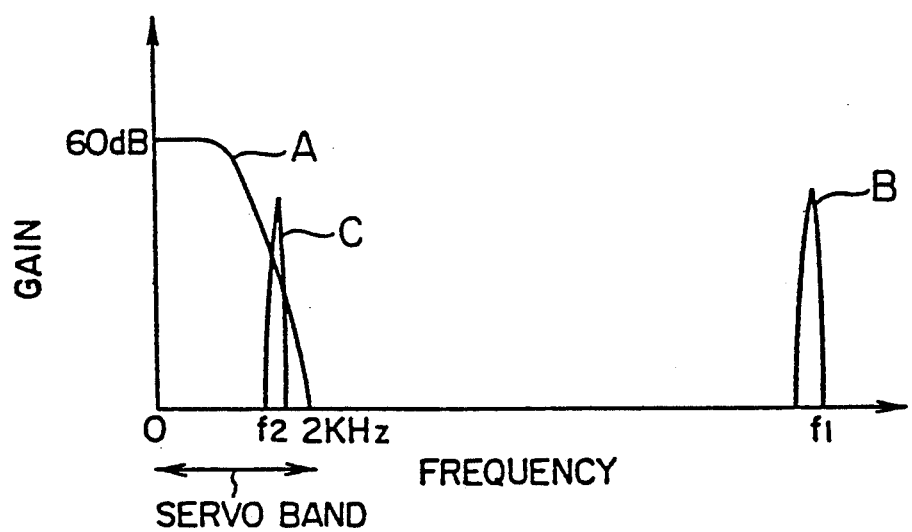
FIG. 17 is a graph showing the frequency characteristic of a control signal in the control system shown in FIG. 16.

FIG. 17 is a view showing the frequency characteristic of gain of such a servo control system. In the figure, since the frequency characteristic of a servo signal for tracking control and focusing control has a band of the order of 0 to 2 KHz as indicated by graph A and a recording signal adopts a frequency higher than that, there is not any problem. Further, a noise signal due to dusts or flaws, etc. on the card is present outside the servo band as indicated by graph B in the figure, resulting in no possibility that this signal disturbs the servo control system. However, it is only an ordinary state where optical card or head at a constant high speed to effect recording or reproduction that the noise signal takes frequency $f_1$ as indicated by graph B. Where optical cards or head is present in acceleration and deceleration regions and its speed is low, noise becomes a low frequency component to take frequency $f_2$ as indicated by graph C in the figure to enter the servo band, with the result that the servo control system becomes unstable. In addition, because mechanical vibration also occurs in the acceleration and deceleration regions, the servo control system is likely to be still more influenced by such a noise. For this reason, there occurs a circumstance such as oscillation of the servo control system or jump to another track, or there occurs the problem that control on the next track becomes impossible.

6.2 Fundamental principle for stabilizing the control system

In FIG. 15(a), the portion on the left side of the position A and the portion on the right side of the position B are acceleration and deceleration sections as described above, and it has been described that the scanning speed by the optical head in these sections is slower than that in the constant speed section between A and B. In such acceleration and deceleration sections, the frequency characteristic of noise signal is an indicated by graph C to overlap with the servo band, with the result that the servo system becomes unstable.

For this countermeasure, when the scanning by the optical head shifts from the constant speed section to the acceleration and deceleration sections, control is conducted on the basis of the open loop control, thus to lock the value of a control signal at a value immediately before the scanning enters the acceleration and deceleration sections. At the time when the scanning has entered the constant speed section for a second time, the control is returnd to the closed loop control as before. In this way, combination of the open loop control and the closed loop control permits a stable control.

6.3 Control system according to this invention

Figure 18:
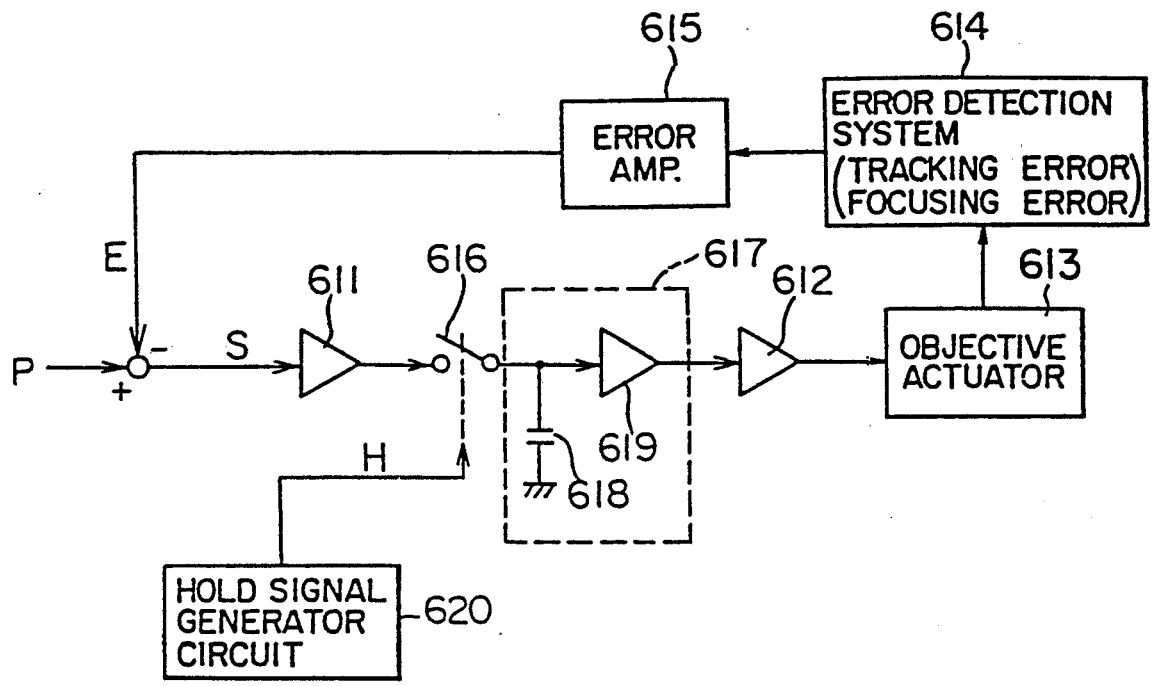
FIG. 18 is a block diagram showing an embodiment of a tracking and focusing control system according to this invention, FIG. 19(a) and (b) are a time chart for explaining the operation of a hold signal generator circuit in the control system shown in FIG. 18.
Figure 19A:
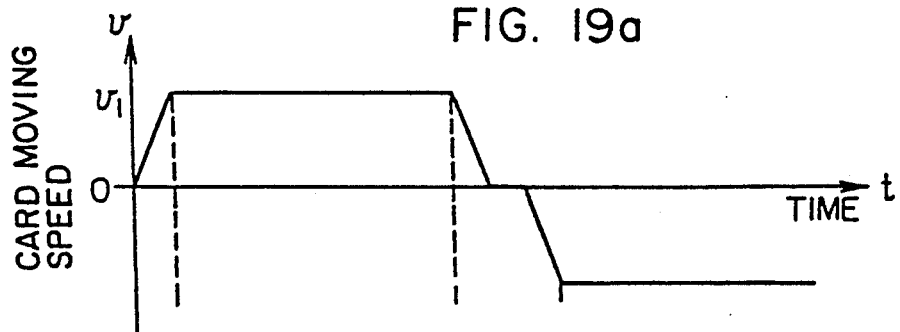
Figure 19B:
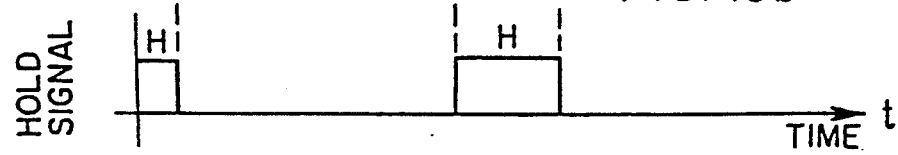

FIG. 18 is a block diagram showing an embodiment of a control system of an optical head used in the data recording and reproducing apparatus for optical card according to this invention, and FIG. 19 is a waveform diagram for explaining the operation thereof wherein the same reference numerals as those in FIG. 16 represent the same contents, respectively. In the figure, reference numeral 616 denotes a switch, reference numeral 617 a hold circuit, reference numeral 618 a capacitor, reference numeral 619 an operational amplifier, and reference numeral 620 a hold signal generator circuit. In the figure, an objective lens (not shown) forming the head is subjected to tracking control and focusing control in the same manner as in the case of FIG. 16, and is driven by an objective actuator 613.

For example, in the case of moving the optical card in such a control system, (1) for a low speed period from the time when the card moving speed begins increasing from zero until it reaches a predetermined speed $v_1$, or (2) for a low speed period from the time when the optical card is decelerated from a constant speed, so that its moving speed is lower than the predetermined speed $v_1$ until a speed in an oppOSite direction reaches the predetermined speed $v_1$ for a second time, a hold signal H is generated by the hold signal generator circuit 620 as shown in FIG. 19, and the switch 616 is turned off. At this time, the hold circuit 617 composed of capacitor 618 and operational amplifier 619 memorizes a control signal immediately before the switch is turned off. By this control signal, the objective actuator 613 is driven to conduct an open loop control with the optical head is locked in the previous state. When the card moving speed is away from the acceleration and deceleration regions to enter the constant speed region for a second time, no hold signal H is generated and the switch 616 is turned on, so that the servo system becomes effective for a second time to carry out the closed loop control of the head. Generally, there is no possibility that the head is out of place to much extent for a time period of the open loop control during which hold signal H is being output, so that the card moving speed is sufficiently controllable until the control is returned to the closed loop control. Since the control is to be opened in acceleration and deceleration regions where noise may give disturbance to the control system, such a possibility that the servo control system becomes unstable by noise to oscillate is eliminated, so that stable control is enabled.

Figure 20:
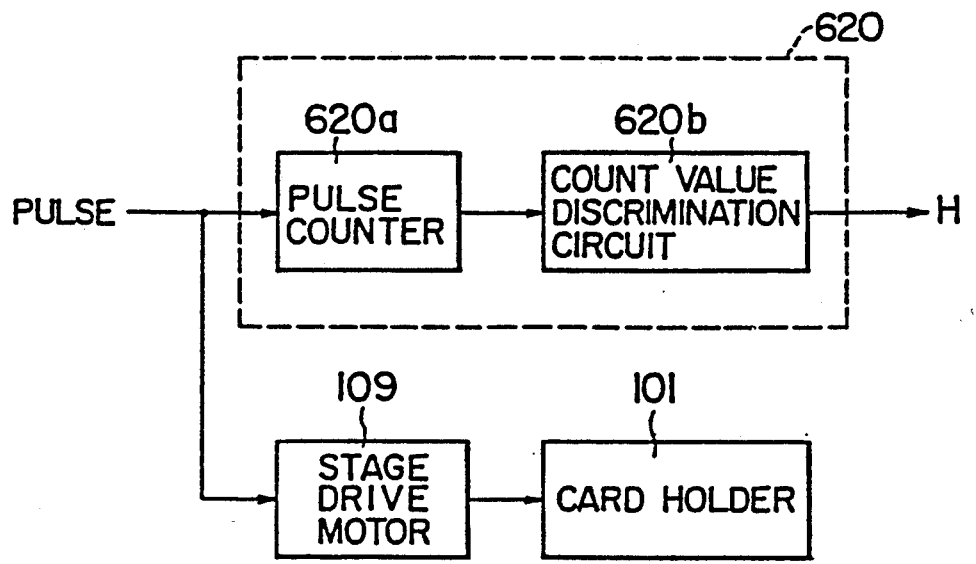
FIG. 20 is a diagram showing an actual construction of the hold signal generator circuit in the control system shown in FIG. 18.

The hold signal generator circuit 620 is a circuit to output hold signal H when the card moving speed is below a certain value as shown in FIG. 19. For example as shown in FIG. 20, this circuit may be composed of a pulse counter 620a and a count value discrimination circuit 620b. Namely, for stage drive motor 109 for driving card holder 101, a pluse motor operative in synchronism with an input pulse is used. By counting pulses delivered to the pulse motor, it is possible to recognize the operating speed of the pulse motor, i.e., card moving speed. Thus, there may be employed such an arrangement to count the number of pulses delivered for a certain time period by the pulse counter 620a to compare this count value with a certain value at the count value discrimination circuit 620b, thus to output hold signal H when that count value is below the certain value.

Figure 21:
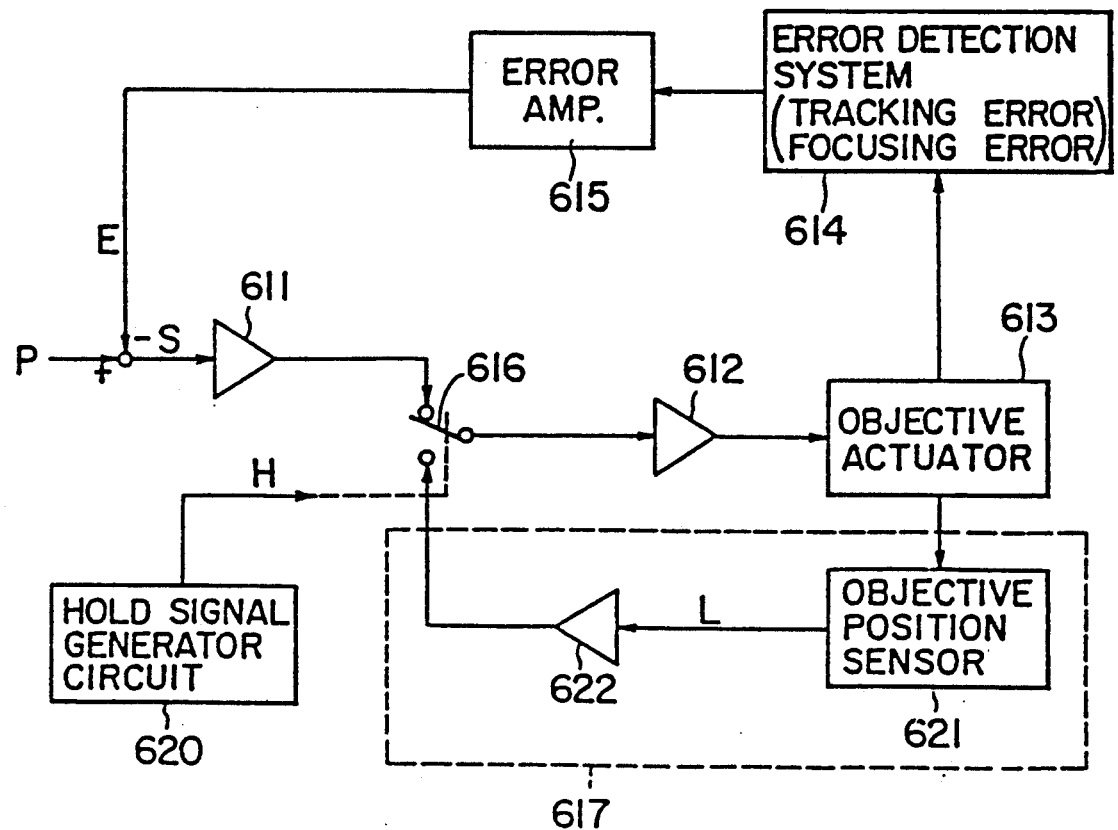
FIG. 21 is a block diagram showing another embodiment of a tracking and focusing control system according to this invention.

While capacitor 618 is used as hold circuit 617 in the embodiment shown in FIG. 18, hold circuit 617 may be realized with any circuit as long as it has a function to lock a vlaue immediately before the card moving speed enters the acceleration and deceleration sections. FIG. 21 is an embodiment where hold circuit 617 is realized with an objective positon sensor 621 and an amplifier 622. The objective position sensor 621 senses an actual position of the objective to output it as a lens position signal L. Since no hold signal H is generated in the constant speed section, switch 616 gives a servo signal S delivered through amplifier 611 to objective actuator 613. However, when the card moving speed enters the acceleration and deceleration sections, switch 616 is changed over by occurrence of hold signal H to give the lens position signal L delivered through amplifier 622 to objective actuator 613. For this reason, the position of the objective is locked at a position immediately before card moving speed enters the acceleration and deceleration sections.

As just described above, in accordance with this invention, the servo control system is opened in acceleration and deceleration regions where noise is apt to give disturbance to the control system becasue the scanning speed is lowered, thus to lock a control signal of the head in a state immediately before the servo control system is opened. Thus, the servo control system is opened. Thus, the servo control system is not influenced by noise, so that stable tracking and focusing controls are permitted.

§7 Binarization circuit for read signal 7.1 Conventional binarization circuit

In the data recording and reproducing apparatus according to this invention, moving speed of the optical card varies interchangeably in positive and negative directions as shown in FIG. 19. Namely, the optical card carries out reciprocating movement. Scanning of tracks by the optical head is conducted by such a reciprocating movement. Thus, a read signal corresponding to pits formed along the tracks is obtained. Since read signal obtained from the optical head is an analog signal based on a quantity of light of a reflected light from the tracks, it is necessary to carry out binarization in order to change such an analog signal to a digital signal.

Figure 22:
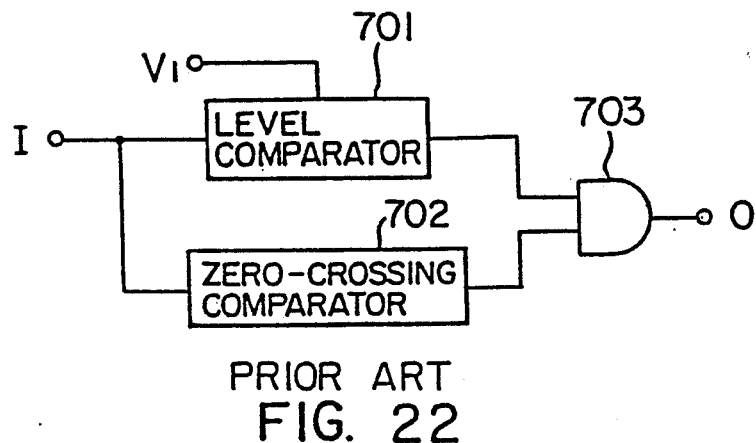
FIG. 22 is a block diagram of a conventional typical binarization circuit, FIG. 23(a) and (b) are a timing chart for explaining the operation of the circuit shown in FIG. 22.

FIG. 22 is a block diagram showing a typical binarization circuit conventionally known. In the figure, reference numeral 701 denotes a level comparator, reference numeral 702 a zero-crossing comparator, and reference numeral 703 an AND gate. In the figure, an analog input signal I is delivered to level comparator 701. When the level of this input signal exceeds above reference voltage $V_1$, level comparator 701 produces an output. At the same time, the input signal I is also delivered zero-crossing comparator 702. This zero-crossing comparator 702 processes a rectangular wave output which represents high level when the input signal is positive and low level when the input signal is negative. Outputs of level comparator 701 and zero-crossing comparator 702 are applied to AND gate 703. Thus, an output of zero-crossing comparator 702 obtained when the level of input signal I exceeds above reference voltage $V_1$ is obtained as a binarized signal 0. In this case, even if noise such as a background signal obtained, e.g., in the acceleration and deceleration regions of the optical card is mixed in, the output of the level comparator 701 is not produced when that noise is smaller than reference voltage value $V_1$. Thus, such a noise component is blocked by AND gate 703 and is eliminated from the binarized signal 0.

Figure 23A:
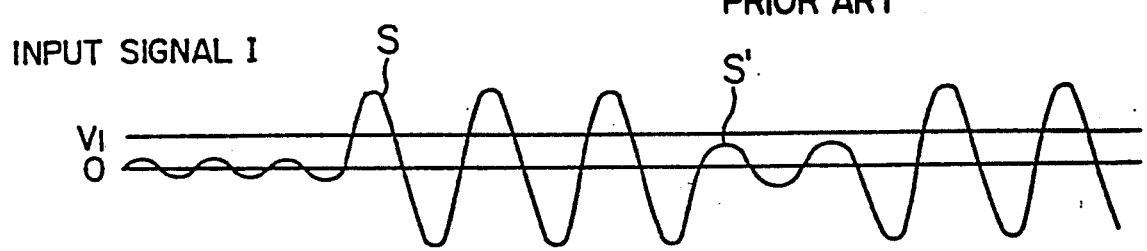
Figure 23B:
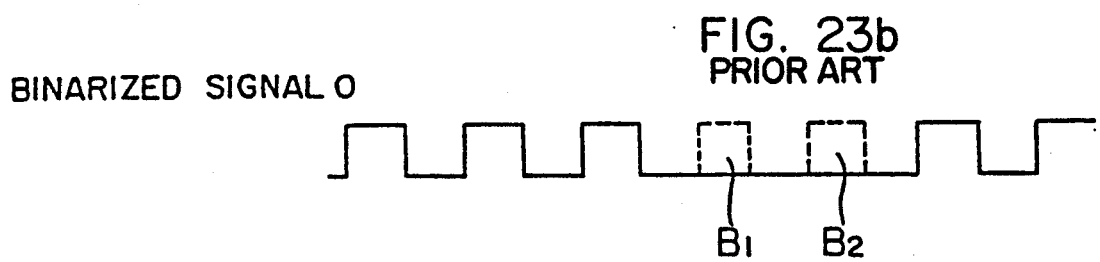

However, where the signal level momentarily falls or drops to S' for any reason, so that it falls below reference voltage $V_1$ in a state where signal S is obtained as shown in FIG. 23(a) in such a conventional binarization circuit as shown in FIG. 22, bits $B_1$ and $B_2$ fall or slip off in the binarized signal 0 as shown in FIG. 23(b), giving rise to the problem that reading error occurs. In the optical card, there is high possibility that defect such as stain or scratching flaw, etc. would occur. As a result, it is foreseen that the fact that the level of the read signal momentarily lowers due to such a defect frequently occurs. This comes to large problem.

7.2 Binarization circuit according to this invention

FIG. 24 is a circuit diagram showing an embodiment of a binarization circuit according to this invention, FIG. 25(a) is a waveform diagram of input signal I to this circuit, FIG. 25(b) is a full-wave rectification waveform diagram thereof, and FIG. 25(c) is a waveform diagram of binarized signal 0. In FIG. 24, $R_1$ to $R_{10}$ denote a register, C a capacitor, $D_1$ and $D_2$ a diode, $Z_D$ a Zener diode, $A_1$ and $A_2$ an operational amplifier, $C_1$ and $C_2$ a comparator, $L_1$ an AND gate, reference numeral 711 a full-wave rectifier circuit, reference numeral 712 an integration circuit, and reference numeral 713 a zero-crossing comparator.

In the figure, resistors $R_3$ and $R_4$, diodes $D_1$ and $D_2$, and operational amplifier $A_1$ constitutes full-wave rectifier circuit 711. An input signal I having been subjected to full-wave rectification is applied to integration circuit 712 composed of capacitor C, resistor $R_6$ and operational amplifier $A_2$ through resistor $R_5$. The output of the integration circuit 712 serves as one input of the comparator $C_1$. A constant voltage obtained by Zener diode $Z_D$ is divided by variable resistor $R_3$ to apply the voltage thus divided to the other input of the comparator $C_1$ as reference voltage $V_1$. On the other hand, the input signal I is applied to zero-crossing comparator 713 composed of comparator $C_2$ and resistors $R_9$ and $R_{10}$. Thus, a rectangular wave signal which represents high level when the signal is positive and low level when the signal is negative is obtained. Outputs of zero-crossing comparator 713 and comparator $C_1$ are applied to AND gate $L_1$.

The operation will be now described with reference to FIG. 25. When only noise component is mixed into input signal I (period $t_1$ of FIG. 25(b)), because the output signal level $V_2$ (indicated by broken lines in the figure) of integration circuit 712 is lower than reference voltage $V_1$, no output is produced from the comparator $C_1$. Thus, the output of the zero-crossing comparator 713 is blocked by AND gate $L_1$, resulting in no binarized signal. When a read signal is given as input signal I (after period $t_2$ in the figure), because output level $V_2$ of integration circuit 712 exceeds above reference voltage $V_1$, an output is obtained from the comparator $C_1$. As a result, AND gate $L_1$ is opened, so that binarized signal from zero-crossing comparator 713 is output. Even if the level of input signal I momentarily lowers (period $t_3$ in the figure) in such a condition, because output level $V_2$ of integration circuit 712 does not immediately lower, there is no possibility that it becomes smaller than reference voltage $V_1$. As a result, since a binarized signal is obtained as usual even at period $t_3$ in the figure, it is possible to prevent a necessary binarized signal from falling or slipping off.

As just described above, this circuit is constructed to apply full-wave rectification to an input signal thereafter to integrate it to make a comparison between its integrated value and a reference voltage to effect a gate control so that the output of zero-crossing comparator is outputted as a binarized signal when the integrated value is larger than the referene voltage, thus making it possible to eliminate a noise signal, and to prevent a binarized signal from slipping or falling off even if the input signal level momentarily lowers.

§8 Device for rendering compatibility with an apparatus of the line sensor reading type

8.1 Apparatus of the line sensor reading type

The apparatus having been described up to §7 is an apparatus of the type which scans a laser beam to carry out reading of pits. On the contrary, an apparatus of the type in which a line senser is used to read pits formed on the side of the surface of the optical card by one column is also known. An apparatus of the line sensor reading type is disclosed, e.g., in the application No. JP86/00134 specification under the Patent Cooperation Treaty.

Figure 26:
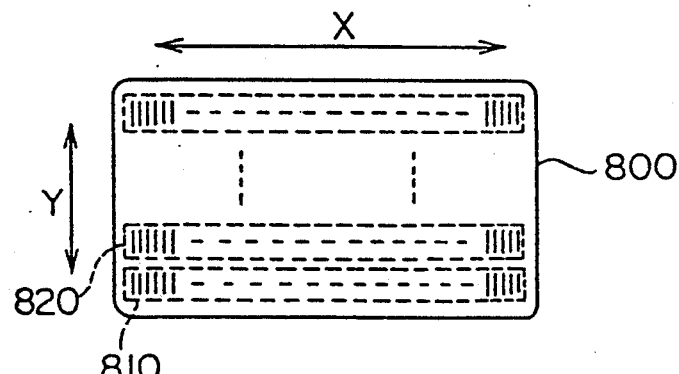
FIG. 26 is a view showing a format suitable for reading by a line sensor.

In the case of carrying out a reading in such an apparatus of the line sensor reading type, it is necessary that the format for recording data onto the optical card is also in conformity therewith. FIG. 26 shows such a data recording format suitable for reading by line sensor. This optical card 800 is divided into a plurality of band areas (indicated by broken lines in the figure). Respective bands are provided in parallel with each other in order of the first band 810, the second band 820, . . . A plurality lines are formed in these bands, respectively. Such an appearance is shown in detail in FIG. 27. In this figure, the left end portion of the first band 810 is shown in an enlarged manner, wherein the first line 11, the second line 12, . . . are arranged from the left in order recited. Pits are arranged in the form of a column in each line and presence of a pit indicates information of one bit.

Figure 27:
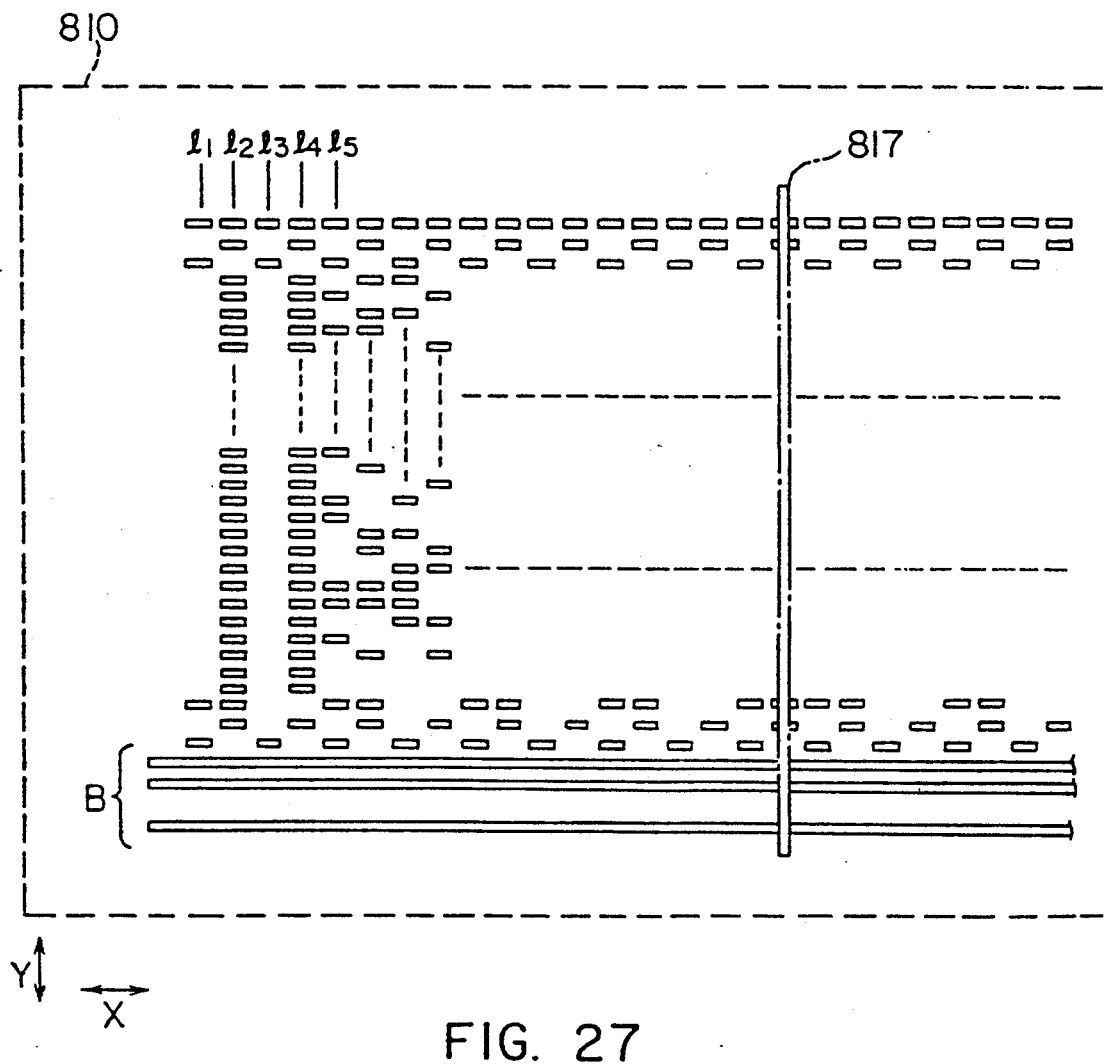
FIG. 27 is a partially enlarged view of FIG. 26.

For a line sensor, a sensor of which entire length is substantially equal to the width of one band is used. As shown in FIG. 27, line sensor 817 is arranged so that its length direction is along the lines of the optical card, and is scanned in an X-direction in the figure. In the case of scanning a different band, optical card 800 or line sensor 817 itself is moved in a Y-direction. The bar B provided in the band serves as a scanning guide in X-direction of this line sensor 817.

Figure 28:
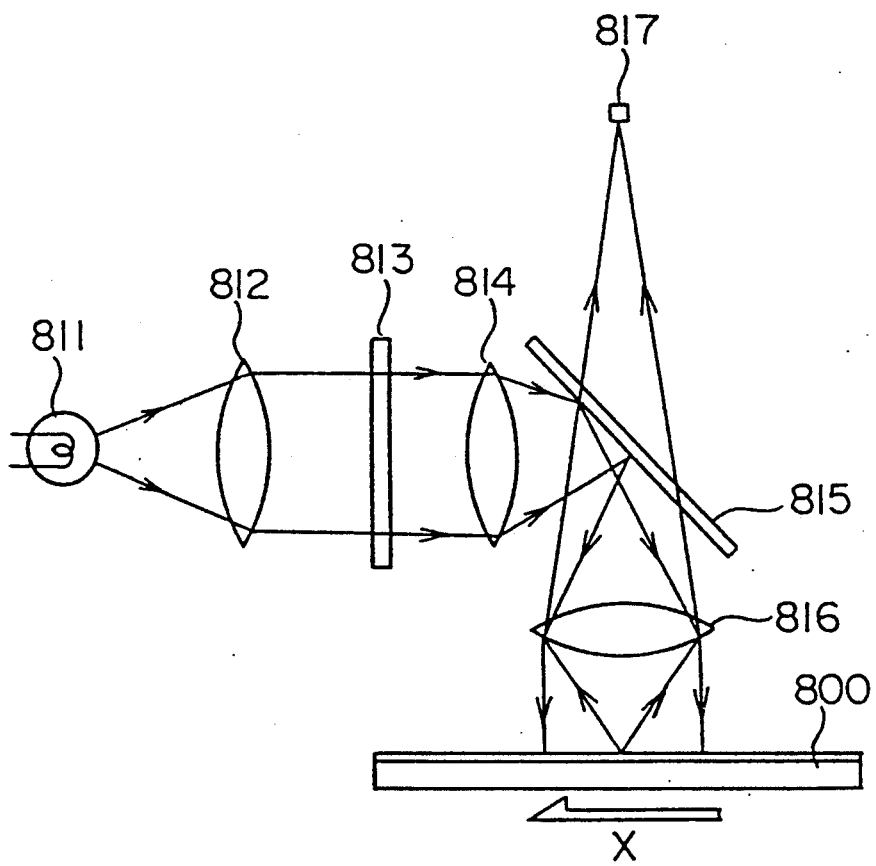
FIG. 28 is a view showing the basic configuration of a data recording and reproducing apparatus for an optical card of the line sensor reading type.

FIG. 28 shows the basic configuration of the apparatus of the line sensor reading sensor wherein reference numeral denotes 811 a light source, reference numeral 812 a collimator lens, reference numeral 813 a diffusion plate, reference numeral 814 a focusing lens, reference numeral 815 a half mirror, reference numeral 816 an objective lens, and reference numeral 817 a line sensor.

In the case of reading data with such an apparatus, an adjustment of the focus with respect to the optical card 800 is made from the light source 811 by the image formation system including collimater lens 812, focusing lens 814, half mirror 815, and objective lens 816 to irradiate a light thereto to read information corresponding to one line at a time by using line sensor 817. By moving the optical card 800 in X-direction as indicated by an arrow to conduct scanning, information of respective lines are read in sequence. In the case of reading information of the next band, the entirety of the optical system is moved in Y-direction to carry out similar scanning.

8.2 Apparatus of two types

The apparatus disclosed in this specification is an apparatus of the type which scans a laser beam to read it, and the recording format onto the optical card is simple as shown in FIG. 15(a). On the contrary, the recording format as shown in FIG. 26 is required in the above-described apparatus of the line sensor reading type. Therefore, the format of the optical card changes according to applied apparatus.

The feature of the apparatus of the line sensor reading type resides in that it is hard to have an influence of double refraction based on a protective layer of the optical card. Since the optical card is carried with it being in a pocket, etc., a protective layer for protecting the data recording surface is indispensable. However, with the system to scan laser beam to read data, it is apt to have an influence of double refraction based on the protective layer and there is high possibility that error in reading occurs. Such a problem is not encountered with the apparatus of the line sensor reading type, so that precise reading is possible.

On the contrary, the feature of the laser beam scanning type resides in that the optical head can be small-sized. Because an image formation optical system for reading information corresponding to one line is required in the system using line sensor, the optical head becomes large-sized eventually. The fact that recording and reproducing can be conducted with the same optical head is also the principal feature of the apparatus of the laser beam scanning type. In recent years, protective layers having small double refraction have been developed. Thus, it is expected that such apparatus of the laser beam scanning type will be increasingly popularized.

8.3 Compatible apparatus

As described above, the apparatus of the laser beam scanning type can carry out both recording and reproducing with the same optical head. It is expected that such an apparatus occupies a main current of data recording and reproducing apparatus for optical card. However, if reading and writing of the optical card recorded in accordance with the format of the line sensor reading type as shown in FIG. 26, this is convenient. The configuration and the operation of an apparatus having such a compatible function will be now described.

The entire configuration of the apparatus is the same as that of the apparatus shown in FIG. 2. The optical head 103 in FIG. 2 is constituted as shown in FIG. 29.

In the figure, reference numeral 821 denotes a head casing, reference numeral 822 a semiconductor laser, reference numeral 823 a beam splitter, reference numeral 824 a collimater lens, reference numeral 825 a quarter wavelength plate, reference numeral 826 a focusing lens, reference numeral 827 an optical card, reference numeral 828 a cylindrical lens, reference numeral 829 a light receiving element, reference numeral 830 a fulcrum, reference numeral 831 a focusing coil, reference numeral 832 a permanent magnet, reference numeral 833 a scanning coil, and reference numeral 834 a permanent magnet.

In the figure, a parallel beam from semiconductor laser 822 is irradiated to optical card 827 through beam splitter 823, collimater lens 824, quarter wavelength plate 825, and objective lens 826 to read a reflected beam by using light receiving element 829 through beam splitter 823 and cylindrical lens 828.

The focusing control mechanism is constituted by placing focusing coil 831 affixed on the side portion of the objective lens 826 in a magnetic field of permanent magnet 832 provided on the outer peripheral portion of the objective lens 826. By controlling a current into the focusing coil 831 to thereby move objective 826 up and down in a direction of light axis as indicated by an arrow A, focusing control is carried out. In this case, the objective 826 is supported by rubber dumper or spring, etc. so as to have degree of freedom with respect to the light axis.

The feature of this optical head resides in that the optical head itself has a scanning mechanism. This scanning mechanism is constituted by placing coil 833 affixed on the side portion of head casing 821 in a magnetic field of permanent magnet 834. By controlling a current into coil 833 to move head 821 as indicated by an arrow B in a manner of pendulum with the point 830 positioned on the light axis being as a fulcrum, scanning is carried out. Also in this case, head casing 821 is supported by rubber dumper or spring, etc. so as to have degree of freedom with respect to the scanning direction. It is to be noted that scanning may be conducted by resiliently supporting the head on both the sides thereof to perform a complete horizontal operation in place of pendulum movement with fulcrum 830 being as a center.

The operation for applying reading or writing to the optical card having a format as shown in FIG. 27 using the apparatus provided with such an optical head is as follows. Initially, the optical card 800 itself moves in an X-direction by card holder 101 shown in FIG. 2. At this time, movement in a Y-direction by head drive motor 108 of optical head 103 is not conducted. In place of this, by allowing a current to flow in coil 833, pendulum movement in Y-direction of head casing 821 is conducted. The amplitude of this pendulum movement is set to substantially the same length as that of one line on the optical card. Accordingly, by the pendulum movement of the head itself, the spot of laser beam irradiated onto the optical card will make a reciprocating movement in the same region as the read region of line sensor 817 indicated by single dotted lines in FIG. 27. Namely, by vibrating the laser beam, the function equivalent to a line sensor having the same length as the width of this vibration can be performed.

As previously described, the optical card is moving in X-direction. By allowing the vibrating speed of the optical head to be sufficiently faster than the movement speed, reading for one line can be carried out by plural times. Thus, secure reading is enabled. In FIG. 27, reading every line is successively conducted in order of the first line 11, the second line 12, . . . . At this time, it is preferable to separately provide a tracking coil (not shown) for carrying out an infinitesimal position control relating to Y-direction of optical head 101, i.e., tracking control in order that optical head 101 follows bar B. In the case of reading lines within the second band 820 after reading of all lines within the first line is completed as stated above, optical head 103 is moved in Y-direction by head drive motor 108.

In a manner stated above, reading of information can be carried out without using the line sensor. In addition to reading, writing can be also conducted in the same manner by increasing the beam strength.

While the permanent magnet is used as a magnet for generating a magnetic field acting on coil, it is needless to say that an electromagnet may be used.

Figure 30:
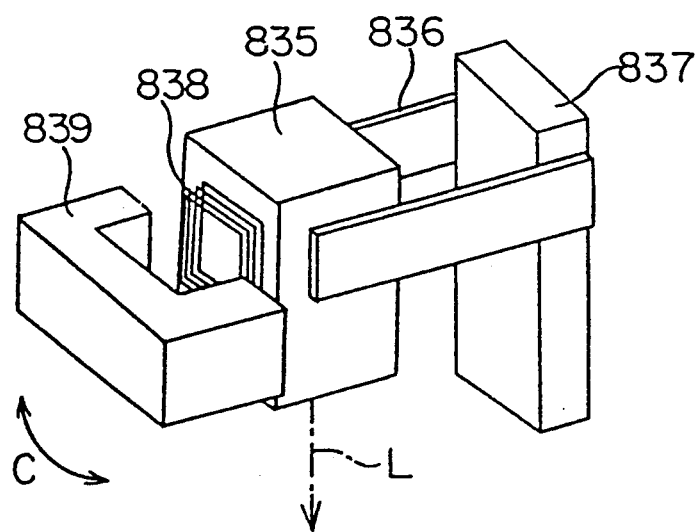

FIG. 30 is a perspective view of a different mechanism for vibrating the optical head itself. In this mechanism, head casing 835 is connected to a supporting post 837 through a supporting resilient body 836. The supporting resilient body 836 is comprised of a rubber or metal flat plate. To the head casing 835, a scanning coil 838 is affixed. By allowing a current to flow through scanning coil 838, there is produced vibration based on interaction with a magnetic field that a permanent magnet 839 produces. Namely, head casing 835 fluctuates in a direction indicated by an arrow C in the figure, thus making it possible to scan laser beam L indicated by single dotted lines. The feature of this mechanism resides in that scanning is permitted such that an irradiation angle with respect to the optical card of the laser beam L is equal to 90 degrees at all times.

The optical head shown in FIGS. 29 and 30 carries out scanning of light beam by allowing the casing itself of the optical head to conduct pendulum movement. Namely, the entirety of the head including the laser light source and the optical system used in focusing undergoes pendulum movement. Although there is no problem in regard to fucusing for this reason, because the entirety of the head has a considerable weight, a drive mechanism which can tolerate such a weight must be employed and the scanning speed cannot be fast so much.

In contrast, the examples shown in FIGS. 31 and 32 permit scanning with a simpler mechanism. The example shown in FIG. 31 is a mechanism which moves only objective lens 841 within the optical head parallelly with respect to optical card 827 to thereby conduct a scanning. If objective lens 841 is present at a position indicated by broken lines, the light beam emitted from the point P forms a spot at the point Q on the optical card 827. When the objective lens 841 is parallelly moved by Δ, the position of the spot shifts to the point Q'. With such a mechanism, it is sufficient to vibrate only the objective lens 841, so that the scanning speed can be improved. In addition, the example shown in FIG. 32 is a mechanism which vibrates mirror 851 within the optical head to thereby conduct scanning. Since the position incident to optical system 852 of the light beam changes according to vibration of mirror 851, the position of the spot on optical card 827 varies. Because it is sufficient to vibrate only mirror 851 also in this mechanism, scanning speed can be improved.

UTILIZABILITY IN INDUSTRY

A data recording and reproducing apparatus for an optical card according to this invention can be widely utilized for data storage units for computer, image data storage units for video system, and terminal processors for credit card, etc.

Further, for a new application of optical cards, it is conceivable that they may be utilized for an address book recording card in which character information such as addresses and names, etc. and map information such as traffic routes, etc. are recorded. When one reads character information and map information from the address book recording card to indicate them on the display, this is very convenient in making a search for his destination. Because optical cards have the merits that they are convenient in carrying, they are extremely suitable for such utilization manner.

In addition, application as a golf score supervisory recording card is conceivable. Namely, optical cards are utilized for a system to record course data, e.g., map of the golf course, handicap, distance and the number of par, etc., and user data, e.g., course name, data, weather, score and play carrier, etc. to conduct a total supervision of golf score. When a recording and reproducing apparatus according to this invention is installed at a suitable place of the golf course, golfers can readily conduct recording and reproducing of their carrying cards.

What is claimed is:

1. A data recording apparatus for use in an optical card on which a plurality of tracks are arranged in parallel, said apparatus comprising:
   card supporting means for supporting a lower surface of said optical card;
   card pressing means for pressing down on an upper surface of said optical card;
   positioning means formed on said supporting means to contact or be spaced away from a first side surface of said optical card;
   pushing means for pushing a second side surface, which is opposite to said first side surface, of said optical card so as to make said first side surface contact said positioning means;
   card drive means for reciprocating said card supporting means in a first direction;
   an optical head for selectively providing access to respective tracks on said optical card to irradiate a light beam at a position above said optical card to conduct recording of data; and
   head drive means for reciprocating said optical head in a second direction perpendicular to said first direction.

2. The data recording apparatus of claim 1, wherein said pushing means comprises:
   a plunger slidably movable with respect to the supporting means to contact the second side surface;
   biasing means for applying a force in a direction allowing said plunger to be spaced away from said second side surface of said optical card; and
   a pressure plate for applying a force in a direction allowing said plunger to be in contact with said second side surface of said optical card.

3. A data reproducing apparatus for sue in an optical card on which a plurality of tracks are arranged in parallel, said apparatus comprising:
   card supporting means for supporting a lower surface of said optical card;
   card pressing means for pressing down on an upper surface of said optical card;
   positioning means formed on said supporting means to contact or be spaced away from a first side surface of said optical card;
   pushing means for pushing a second side surface, which is opposite to said first side surface, of said optical card so as to make said first side surface contact said positioning means;
   card drive means for reciprocating said card supporting means in a first direction;
   an optical head for selectively providing access to respective tracks on said optical card to irradiate a light beam at a position above said optical card to conduct reproducing of data; and
   head drive means for reciprocating said optical head in a second direction perpendicular to said first direction.

4. The data reproducing apparatus of claim 2, wherein said pushing means comprises:
   a plunger slidably movable with respect to the supporting means to contact the second side surface;
   biasing means for applying a force in a direction allowing said plunger to be spaced away from said second side surface of said optical card; and
   a pressure plate for applying a force in a direction allowing said plunger to be in contact with said second side surface of said optical card.

5. A data recording apparatus for use in an optical card on which a plurality of tracks are arranged in parallel, said apparatus comprising:
   card supporting means for supporting said optical card;
   card drive means for reciprocating said card supporting means in a first direction;
   an optical head for selectively providing access to respective tracks on said optical card to irradiate a light beam at a position above said optical card to conduct recording of data;
   head drive means for reciprocating said optical head in a second direction perpendicular to said first direction; and
   electromagnetic drive means for reciprocating said optical head in said second direction so as to scan said light beam.

6. A data reproducing apparatus for use in an optical card on which a plurality of tracks are arranged in parallel, said apparatus comprising:
   card supporting means for supporting said optical card;
   card drive means for reciprocating said card supporting means in a first direction;

an optical head for selectively providing access to respective tracks on said optical card to irradiate a light beam at a position above said optical card to conduct reproducing of data;

head drive means for reciprocating said optical head in a second direction perpendicular to said first direction; and electromagnetic drive means for reciprocating said optical head in said second direction so as to scan said light beam.

* * * * *